United States Patent
Wang et al.

(10) Patent No.: US 11,829,260 B2
(45) Date of Patent: Nov. 28, 2023

(54) FAULT REPAIR METHOD FOR DATABASE SYSTEM, DATABASE SYSTEM, AND COMPUTING DEVICE

(71) Applicant: HUAWEI TECHNOLOGIES CO., LTD., Guangdong (CN)

(72) Inventors: Chuanting Wang, Beijing (CN); Zhongchu Zhu, Shenzhen (CN); Yuhui Xing, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 35 days.

(21) Appl. No.: 17/525,415

(22) Filed: Nov. 12, 2021

(65) Prior Publication Data

US 2022/0066886 A1 Mar. 3, 2022

Related U.S. Application Data

(63) Continuation of application No. PCT/CN2020/089909, filed on May 13, 2020.

(30) Foreign Application Priority Data

May 13, 2019 (CN) .......................... 201910395371.7

(51) Int. Cl.
*G06F 16/21* (2019.01)
*G06F 11/14* (2006.01)

(52) U.S. Cl.
CPC ...... *G06F 11/1469* (2013.01); *G06F 11/1425* (2013.01); *G06F 11/1471* (2013.01); *G06F 16/21* (2019.01)

(58) Field of Classification Search
CPC ............. G06F 11/1469; G06F 11/1425; G06F 11/1471; G06F 16/21; G06F 2201/80;
(Continued)

(56) References Cited

U.S. PATENT DOCUMENTS

| 5,333,303 A | 7/1994 | Mohan |
| 5,951,695 A | 9/1999 | Kolovson |

(Continued)

FOREIGN PATENT DOCUMENTS

| CN | 103530253 A | 1/2014 |
| CN | 104216806 A | 12/2014 |

(Continued)

OTHER PUBLICATIONS

Office Action issued in Chinese Application No. 201910395371.7 dated Apr. 19, 2022, 11 pages (with English translation).
(Continued)

*Primary Examiner* — Apu M Mofiz
*Assistant Examiner* — Cindy Nguyen
(74) *Attorney, Agent, or Firm* — Gregg L. Jansen

(57) ABSTRACT

The present disclosure relates to fault repair methods for a database system. In one example method, when working normally, a master node backs up, to a global buffer pool (GBP) node by using a data transmission protocol with a low latency and a high throughput (for example, a remote direct memory access (RDMA) protocol), a modified page generated because of transaction modification. When the master node is faulty, a standby node does not need to replay all remaining replay logs that are not replayed, but only needs to replay redo logs corresponding to a page that does not exist on the GBP node and pages that are not sequentially arranged and obtain the pages.

20 Claims, 13 Drawing Sheets

(58) Field of Classification Search
CPC ............ G06F 11/2028; G06F 11/2038; G06F 11/2043; G06F 11/2094; G06F 11/2097; G06F 16/273
See application file for complete search history.

(56) References Cited

U.S. PATENT DOCUMENTS

| | | | |
|---|---|---|---|
| 9,135,123 B1* | 9/2015 | Armangau | ............ G06F 16/172 |
| 2005/0223043 A1 | 10/2005 | Randal et al. | |
| 2008/0140937 A1 | 6/2008 | Nalawade et al. | |
| 2015/0120659 A1* | 4/2015 | Srivastava | .............. G06F 16/27 |
| | | | 707/625 |
| 2015/0254264 A1 | 9/2015 | Yu et al. | |
| 2016/0283331 A1* | 9/2016 | Barber | ................ G06F 11/1471 |
| 2017/0300391 A1 | 10/2017 | Namburi | |
| 2018/0260287 A1* | 9/2018 | Iyer | .................... G06F 11/1464 |

FOREIGN PATENT DOCUMENTS

| | | |
|---|---|---|
| CN | 104573112 A | 4/2015 |
| CN | 106815275 A | 6/2017 |
| CN | 108874588 A | 11/2018 |
| WO | 2018137327 A1 | 8/2018 |

OTHER PUBLICATIONS

PCT International Search Report and Written Opinion issued in International Application No. PCT/CN2020/089909 dated Jul. 29, 2020, 16 pages (with English translation).

Extended European Search Report issued in European Application No. 20806356.0 dated Jun. 7, 2022, 8 pages.

Wang et al., "Query Fresh:Log Shipping on Steroids," Proceedings of the VLDB Endowment, vol. 11, No. 14, Dec. 2017, 14 pages.

Du Li- lin et al., "On Strategies for Cache Optimization of Oracle RAC Data Base",Oct. 2011,total:2pages.

* cited by examiner

S101. When a master node works normally, the master node sends a plurality of pages to a GBP node by using a first data transmission protocol S102. The GBP node writes the plurality of pages into a cache queue of the GBP node S103. When the master node is faulty, a standby node determines a GBP start point, a GBP recovery point, and a GBP end point S105. When a disk recovery point is greater than or equal to the GBP start point and a disk end point is greater than or equal to the GBP end point, the standby node replays all redo logs between a redo log corresponding to the GBP recovery point and a redo log corresponding to the disk end point, so that the standby node is switched to a new master node, thereby implementing fault repair of a database system

FIG. 4

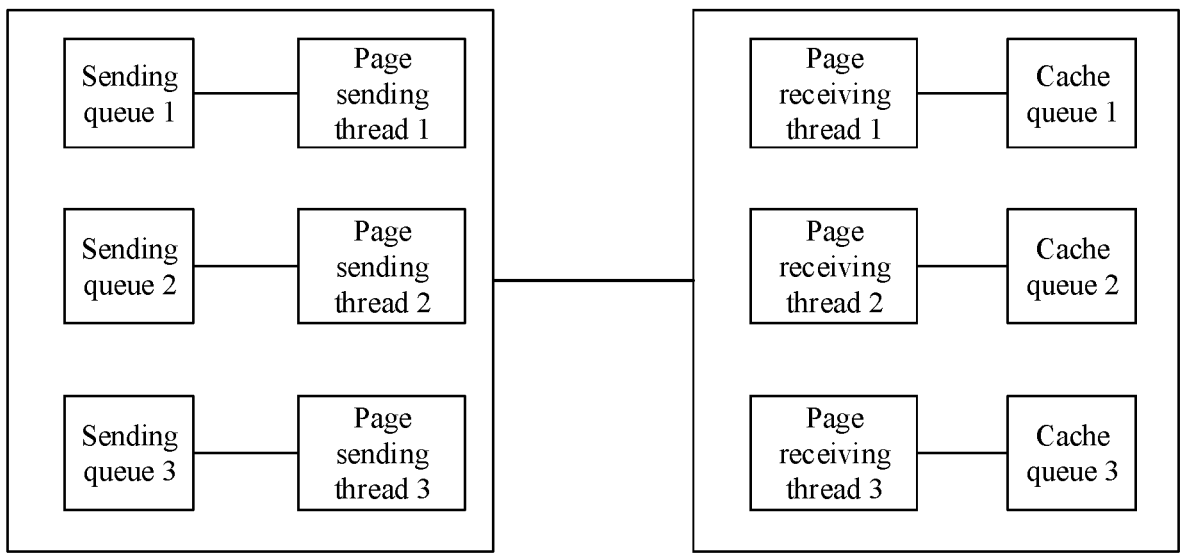

FIG. 5

S201. When a master node is faulty, determine a GBP start point, a GBP recovery point, and a GBP end point
S203. When a disk recovery point is greater than or equal to the GBP start point and a disk end point is greater than or equal to the GBP end point, replay all redo logs between a redo log corresponding to the GBP recovery point and a redo log corresponding to the disk end point
FIG. 10
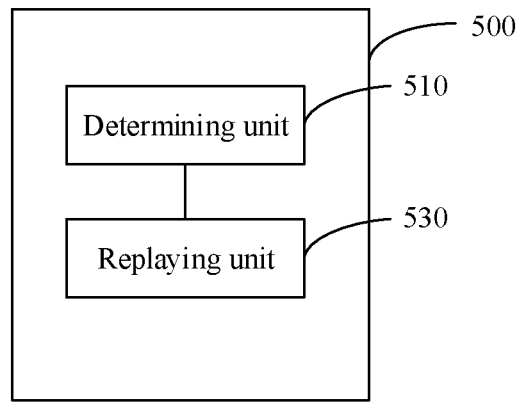
FIG. 11A
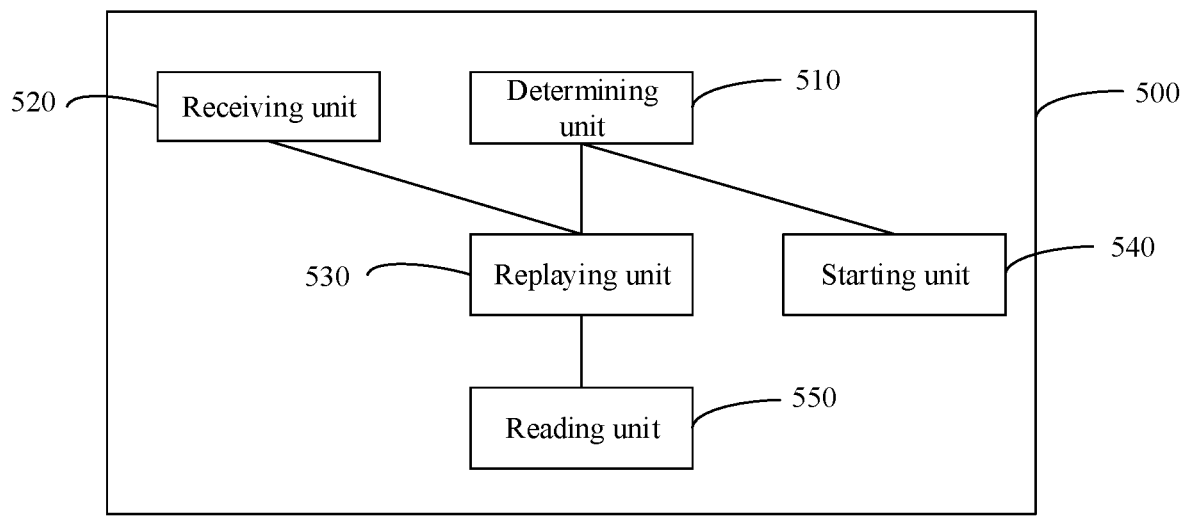
FIG. 11B S311. During normal working, send a plurality of pages to a GBP node by using a first data transmission protocol S313. When a fault occurs, determine a GBP start point, a GBP recovery point, and a GBP end point S315. When a disk recovery point is greater than or equal to the GBP start point and a disk end point is greater than or equal to the GBP end point, replay all redo logs between a redo log corresponding to the GBP recovery point and a redo log corresponding to the disk end point

FIG. 16

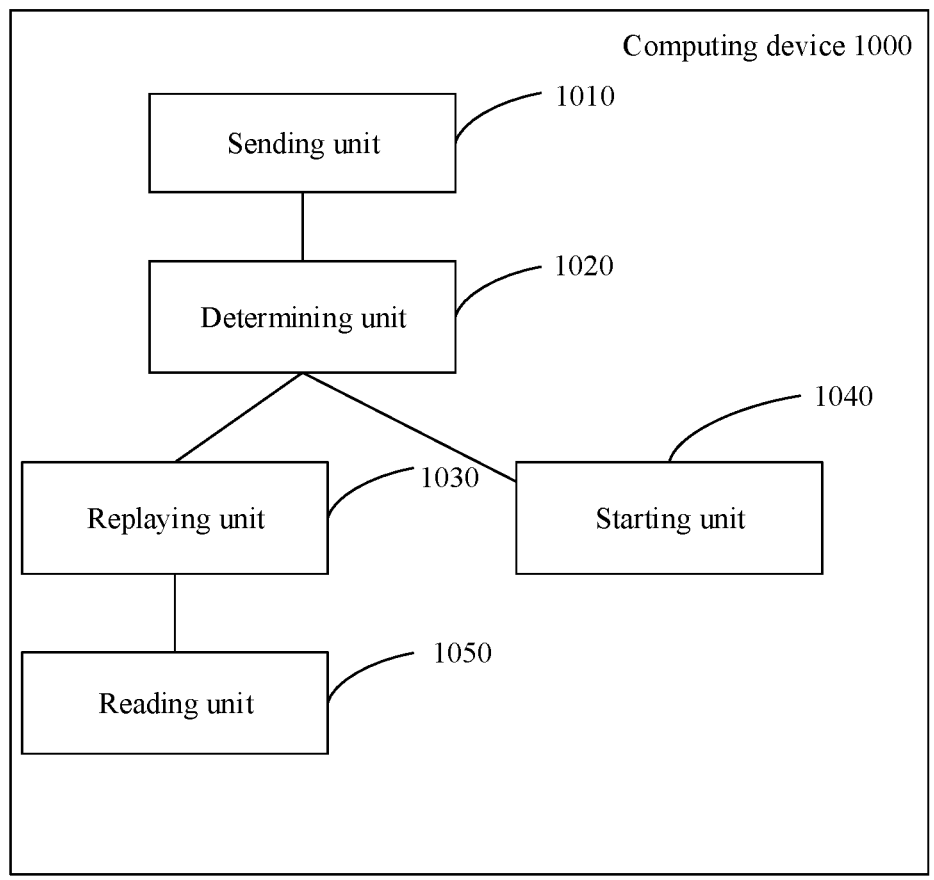

FIG. 17

FAULT REPAIR METHOD FOR DATABASE SYSTEM, DATABASE SYSTEM, AND COMPUTING DEVICE

CROSS-REFERENCE TO RELATED APPLICATIONS

This application is a continuation of International Application No. PCT/CN2020/089909, filed on May 13, 2020, which claims priority to Chinese Patent Application No. 201910395371.7, filed on May 13, 2019. The disclosures of the aforementioned applications are hereby incorporated by reference in their entireties.

TECHNICAL FIELD

This application relates to the field of database technologies, and in particular, to a fault repair method for a database system, a corresponding database system, and a corresponding computing device.

BACKGROUND

FIG. 1 shows a database system, including a master node 110 and a standby node 130. The master node 110 and the standby node 130 are disposed to ensure reliability of the database system. The master node 110 and the standby node 130 have respective data storage and log storage. The master node 110 modifies a page (page) to generate a redo log (redo log), the master node 110 transmits the redo log to the standby node, and the standby node 130 receives the redo log and replays the redo log, so that data synchronization between the standby node 130 and the master node 110 is implemented.

Receiving the redo log and replaying the redo log by the standby node 130 are two parallel processes. The standby node 130 can receive redo logs in batches and write the redo logs into a local memory, and replay the redo logs one by one. Generally, a log replay speed is lower than a log receiving speed. For example, if 10 G logs are received, only 8 G logs may be replayed, and 2 G logs are to be replayed. When the master node 110 is faulty, the standby node 130 needs to complete replaying all received redo logs to be synchronized with the master node 110 existing before the fault occurs and replace the master node 110 as a new master node (also referred to as "failover" or "database system recovery"). A recovery time objective (Recovery Time Objective, RTO) is time required for the standby node 130 to be promoted to the new master node. It can be learned from the master node-standby node switching process that the RTO depends on a quantity of to-be-replayed logs. A larger quantity of to-be-replayed logs causes a larger RTO, and further, service continuity is affected.

SUMMARY

This application relates to a fault repair method for a database system, to reduce time required by the database system to repair a fault and improve fault repair efficiency when the database system is faulty. In addition, this application further provides a corresponding database system and a corresponding computing device.

According to a first aspect, this application provides a fault repair method for a database system. The method includes the following content: When a master node works normally, the master node sends a plurality of pages to a global buffer pool (GBP) node by using a first data transmission protocol. The GBP node writes the plurality of pages into a cache queue of the GBP node. Log sequence numbers (LSNs) corresponding to the plurality of pages are in ascending order based on a sequence from a header to a tail of the cache queue.

When the master node is faulty, a standby node determines a GBP start point, a GBP recovery point, and a GBP end point.

The GBP start point indicates a smallest LSN included in all pages stored on the GBP node. The GBP recovery point indicates a smallest LSN included in a batch of pages received by the GBP node most recently. The GBP end point indicates a largest LSN included in the batch of pages received by the GBP node most recently.

When a disk recovery point is greater than or equal to the GBP start point and a disk end point is greater than or equal to the GBP end point, the standby node replays all redo logs between a redo log corresponding to the GBP recovery point and a redo log corresponding to the disk end point, so that the standby node is promoted to a new master node.

The disk recovery point indicates a smallest LSN included in a batch of a plurality of most recently written pages in a disk of the standby node. The disk end point indicates an LSN of a last redo log received by the standby node.

It should be noted that a page buffer of the GBP node includes one or more cache queues, a plurality of pages are stored in each cache queue, and LSNs included in a plurality of pages in a same cache queue are in ascending order based on a sequence from a header to a tail of the cache queue.

It should be noted that in this embodiment, that the standby node replays a redo log corresponding to the GBP recovery point and a redo log corresponding to the disk end point specifically means that the standby node replays the redo log corresponding to the GBP recovery point, the redo log corresponding to the disk end point, and all other redo logs between the redo log corresponding to the GBP recovery point and the redo log corresponding to the disk end point. In other words, the redo logs to be replayed by the standby node fall within a closed interval. Therefore, the standby node further needs to replay redo logs at both ends of the closed interval.

With reference to the foregoing embodiment, it is easy to learn that when the master node is faulty, the standby node no longer continues to replay all redo logs that are not replayed, but determines the GBP start point, the GBP recovery point, the GBP end point, the disk recovery point, and the disk end point, and replays all the redo logs between the redo log corresponding to GBP recovery point and the redo log corresponding to the disk end point when the disk recovery point is greater than or equal to the GBP start point and the disk end point is greater than or equal to the GBP end point (or simply referred to as "when a condition is met"), to perform fault repair on the database system.

It is known that after the master node modifies a page, a redo log corresponding to the modified page is generated, and then the master node sends the redo log to the standby node; and the standby node can obtain the corresponding modified page by replaying the redo log. In other words, the standby node is synchronized with the master node by replaying the redo log.

Currently, if the master node is faulty, the standby node continues to replay all remaining redo logs that are not replayed and that are transferred by the master node before the fault occurs, until all redo logs received by the standby node are replayed. Then the standby node can be synchronized with the master node existing before the fault occurs, and then the standby node replaces the faulty master node as a new master node.

However, in this embodiment, after the master node is faulty, the standby node no longer continues to replay all redo logs that are not replayed, but replays all the redo logs between the redo log corresponding to the GBP recovery point and the redo log corresponding to the disk end point. None of redo logs between a redo log corresponding to the disk recovery point and the redo log corresponding to the GBP recovery point are replayed. Briefly, in this embodiment, after the master node is faulty, the standby node replays only a quite small part of all the redo logs that are not replayed. Therefore, using the technical solution provided in this embodiment can improve fault repair efficiency of the database system.

In this embodiment, only a small part of redo logs need to be replayed instead of all redo logs for the following reason: The master node sends modified pages to the GBP node by using the first data transmission protocol (for example, an RDMA protocol). Based on the first data transmission protocol, the master node sends pages to the GBP node quite quickly. When the master node is faulty, most modified pages in the master node have been sent to the GBP node and been sequentially written into the cache queue of the GBP node by the GBP node. Therefore, the standby node does not need to replay the redo logs between the redo log corresponding to the disk recovery point and the redo log corresponding to the GBP recovery point, but only needs to replay a redo log corresponding to a modified page that does not exist on the GBP node and redo logs corresponding to modified pages that are not sequentially written in the cache queue of the GBP node. Redo logs corresponding to pages that are sequentially arranged in the cache queue of the GBP node do not need to be replayed, and this part of pages can be directly pulled from the GBP node to the standby node.

With reference to the first aspect, in a first possible implementation, none of the redo logs between the redo log corresponding to the disk recovery point and the redo log corresponding to the GBP recovery point are replayed.

It is easy to learn that in this embodiment, the standby node skips all the redo logs between the redo log corresponding to the disk recovery point and the redo log corresponding to the GBP recovery point, and replays all the redo logs between the redo log corresponding to the GBP recovery point and the redo log corresponding to the disk end point. In other words, in this embodiment, the standby node replays only a part but not all of logs that are not replayed. Therefore, fault repair efficiency of the database system is improved.

With reference to the first aspect or the first possible implementation of the first aspect, in a second possible implementation, the GBP node maintains the GBP recovery point and the GBP end point, and after the GBP node writes the plurality of pages into the cache queue of the GBP node, the fault repair method further includes: The GBP node updates the GBP recovery point and the GBP end point based on the plurality of pages.

Correspondingly, that a standby node determines a GBP recovery point and a GBP end point includes: The standby node obtains an updated GBP recovery point and an updated GBP end point from the GBP node.

In this embodiment, after writing the plurality of received pages into the cache queue of the GBP node, the GBP node further updates the GBP recovery point and the GBP end point based on the plurality of pages. Then the standby node obtains the updated GBP recovery point and the updated GBP end point from the GBP node. Because the GBP node writes the plurality of pages into the cache queue of the GBP node, maintaining the GBP recovery point and the GBP end point by the GBP node may ensure that the GBP recovery point and the GBP end point can be updated in a timely manner.

With reference to the first aspect, in a first possible implementation, none of the redo logs between the redo log corresponding to the disk recovery point and the redo log corresponding to the GBP recovery point are replayed.

It is easy to learn that in this embodiment, the standby node skips all the redo logs between the redo log corresponding to the disk recovery point and the redo log corresponding to the GBP recovery point, and replays all the redo logs between the redo log corresponding to the GBP recovery point and the redo log corresponding to the disk end point. In other words, in this embodiment, the standby node replays only a part but not all of logs that are not replayed. Therefore, fault repair efficiency of the database system is improved.

With reference to the first aspect or the first possible implementation of the first aspect, in a second possible implementation, the GBP node maintains the GBP recovery point and the GBP end point, and after the GBP node writes the plurality of pages into the cache queue of the GBP node, the GBP node updates the GBP recovery point and the GBP end point based on the plurality of pages.

Correspondingly, the standby node obtains an updated GBP recovery point and an updated GBP end point from the GBP node.

In this embodiment, after writing the plurality of received pages into the cache queue of the GBP node, the GBP node further updates the GBP recovery point and the GBP end point based on the plurality of pages. Then the standby node obtains the updated GBP recovery point and the updated GBP end point from the GBP node. Because the GBP node writes the plurality of pages into the cache queue of the GBP node, maintaining the GBP recovery point and the GBP end point by the GBP node can ensure that the GBP recovery point and the GBP end point can be updated in a timely manner.

With reference to the first aspect or the first possible implementation of the first aspect, in a third possible implementation, the GBP node maintains the GBP start point, and when the GBP node receives a new page that does not exist in the page buffer of the GBP node and the page buffer of the GBP node is full, the GBP node evicts a page located in the header of the cache queue, writes the new page into the tail of the cache queue, and updates the GBP start point to an LSN corresponding to a new header page of the cache queue.

Correspondingly, the standby node obtains the updated GBP start point from the GBP node.

It should be explained that the "new page" is a page currently received by the GBP node. "A new page that does not exist in the page buffer of the GBP node" means that a currently received page does not exist in the page buffer of the GBP node. For example, a page M is currently received, and the page M does not exist in the page buffer of the GBP node.

In this embodiment, because the GBP node writes the plurality of pages into the cache queue of the GBP node, maintaining the GBP start point by the GBP node can ensure that the GBP start point can be updated in a timely manner.

With reference to the first aspect or the first possible implementation of the first aspect, in a fourth possible implementation, when the GBP node receives a new page that does not exist in the page buffer of the GBP node, the GBP node places the new page at the tail of the cache queue.

When the GBP node receives a new page that exists in the page buffer of the GBP node, the GBP node updates an existing corresponding page based on the received new page, and places the updated new page at the tail of the cache queue.

As described above, the "new page" is a page currently received by the GBP node. For example, if the page currently received by the GBP node is a page M, and an LSN included in the page M is T, the page M is a "new page". Correspondingly, when the page M does not exist in the page buffer of the GBP node, the page M is placed at the tail of the cache queue. On the contrary, when a page M exists in the page buffer of the GBP node (the page M is located in a cache queue R and an LSN included in the page M is K), the existing page M is updated by using the currently received page M, and the updated page M is placed at a tail of the cache queue R. It should be noted that both K and T are integers greater than or equal to 0, and T is greater than K.

It should be noted that when the page M does not exist in the page buffer of the GBP node before the page M is received, a cache queue in which the page M is to be placed may be determined by using a hash algorithm, or may be determined by using another method.

It can be learned from this embodiment that pages are sequentially placed in the cache queue of the GBP node. Therefore, all redo logs between the redo log corresponding to the GBP recovery point and a redo log corresponding to the GBP end point are last redo logs in all redo logs sent by the master node to the standby node. It can be learned that using this embodiment can ensure that the standby node can be synchronized with the master node after completing the replaying step.

With reference to any one of the first aspect or the first to the fourth possible implementations of the first aspect, in a fifth possible implementation, when the disk recovery point is greater than or equal to the GBP start point and the disk end point is greater than or equal to the GBP end point, the standby node further starts a background thread, where the background thread is configured to pull all the pages stored on the GBP node to a page buffer of the standby node.

Optionally, the background thread is configured to pull all the pages stored on the GBP node to the page buffer of the standby node by using a second data transmission protocol. The second data transmission protocol is also a data transmission protocol with a low latency and a high throughput. Therefore, the background thread can quickly pull all the pages stored on the GBP node to the standby node.

Optionally, the standby node starts the background thread in a replaying process. In other words, the background thread may pull the pages from the GBP node to the page buffer of the standby node in parallel with replaying, so that time can be saved and fault repair efficiency can be improved.

It should be noted that after the standby node pulls all the pages stored on the GBP node to the page buffer of the standby node, the standby node further compares the page pulled to the page buffer of the standby node with a page maintained by the standby node, and retains a new page and discards an old page.

With reference to any one of the first aspect or the first to the fifth possible implementations of the first aspect, in a sixth possible implementation, after the standby node completes the replaying step, when a page that needs to be accessed by an application on the standby node is still located in the page buffer of the GBP node, the application reads, from the page buffer of the GBP node, the page that needs to be accessed.

Optionally, the application reads, from the page buffer of the GBP node by using the second data transmission protocol, the page that needs to be accessed.

With reference to any one of the first aspect or the first to the sixth possible implementations of the first aspect, in a seventh possible implementation, after the master node is faulty, before the standby node performs the replaying step, the standby node further locally obtains the disk recovery point and the disk end point. The standby node obtains the disk recovery point and the disk end point, so that it is determined whether the fault repair method described in the foregoing embodiment can be used.

With reference to any one of the first aspect or the first to the seventh possible implementations of the first aspect, in an eighth possible implementation, when the master node works normally, the master node further sends redo logs to the standby node. The standby node replays the received redo logs to obtain corresponding pages.

Further, the standby node further flushes the obtained pages to the local disk in batches.

With reference to any one of the first aspect or the first to the eighth possible implementations of the first aspect, in a ninth possible implementation, the master node starts a page sending thread, and the page sending thread sends a plurality of pages in a sending queue to the GBP node in batches based on a sequence from a header to a tail of the sending queue by using the first data transmission protocol. The sending queue is located in the master node, and LSNs corresponding to the plurality of pages in the sending queue are in ascending order from the header to the tail of the sending queue.

Because the LSNs corresponding to the plurality of pages in the sending queue are in ascending order, the page sending thread sends the plurality of pages to the GBP node based on the sequence from the header to the tail of the sending queue, to ensure that the GBP node also sequentially receives the pages. Specifically, an LSN of a page that is first received is less than an LSN of a page that is subsequently received. When the GBP node writes the plurality of received pages into the cache queue of the GBP node, the GBP node may write the plurality of pages into the cache queue of the GBP node based on a sequence of receiving the pages, so that LSNs of the plurality of pages in the cache queue are in ascending order based on the sequence from the header to the tail of the cache queue. In other words, using this solution can relatively simply implement a case in which the plurality of pages in the cache queue are in ascending order based on the sequence from the header to the tail of the cache queue.

With reference to the ninth possible implementation of the first aspect, in a tenth possible implementation, the master node starts a plurality of page sending threads, and there is a one-to-one relationship between the plurality of page sending threads and a plurality of sending queues included in the master node. An advantage of this embodiment is that because there is a one-to-one relationship between the page sending threads and the sending queues, operations are relatively simple and are not error-prone.

With reference to the ninth or the tenth possible implementation of the first aspect, in an eleventh possible implementation, the GBP node starts a page receiving thread, and the page receiving thread receives the plurality of pages in batches, and writes the plurality of pages into the cache queue of the GBP node.

With reference to the eleventh possible implementation of the first aspect, in a twelfth possible implementation, the GBP node starts a plurality of page receiving threads, there is a one-to-one relationship between the plurality of page receiving threads and a plurality of cache queues included in the GBP node, and there is a one-to-one relationship between the plurality of page sending threads started by the master node and the plurality of page receiving threads started by the GBP node. An advantage of this embodiment is that because there is a one-to-one relationship between the page receiving threads and the cache queues, and there is also a one-to-one relationship between the page sending threads and the page receiving threads, operations are relatively simple and are not error-prone.

According to a second aspect, this application provides a database system. The database system includes a master node, a standby node, and a GBP node. The master node and the GBP node are communicatively connected by using a first data transmission protocol.

The master node is configured to send a plurality of pages to the GBP node. The GBP node is configured to write the plurality of pages into a cache queue of the GBP node. LSNs corresponding to the plurality of pages are in ascending order based on a sequence from a header to a tail of the cache queue.

When the master node is faulty, the standby node is configured to determine a GBP start point, a GBP recovery point, and a GBP end point.

It should be noted that the GBP start point indicates a smallest log sequence number (LSN) included in all pages stored on the GBP node. The GBP recovery point indicates a smallest LSN included in a batch of pages received by the GBP node most recently. The GBP end point indicates a largest LSN included in the batch of pages received by the GBP node most recently.

When a disk recovery point is greater than or equal to the GBP start point and a disk end point is greater than or equal to the GBP end point, the standby node is further configured to replay all redo logs between a redo log corresponding to the GBP recovery point and a redo log corresponding to the disk end point, so that the standby node is promoted to a new master node.

The disk recovery point indicates a smallest LSN included in a batch of a plurality of most recently written pages in a disk of the standby node. The disk end point indicates an LSN of a last redo log received by the standby node.

With reference to the foregoing embodiment, it can be learned that when the master node of the database system is faulty and a condition (the condition is that the disk recovery point is greater than or equal to the GBP start point and the disk end point is greater than or equal to the GBP end point) is met, the standby node can be promoted to the new master node by replaying a small part of redo logs between the redo log corresponding to the GBP recovery point and the redo log corresponding to the disk end point. It can be learned from the foregoing that in the database system provided in this embodiment, after the master node is faulty, it takes only quite short time to generate a new master node. Therefore, using the database system can improve service continuity.

With reference to the second aspect, in a first possible implementation, none of redo logs between a redo log corresponding to the disk recovery point and the redo log corresponding to the GBP recovery point are replayed.

This embodiment is intended to further clarify the following case: The standby node replays only one part of all remaining redo logs that are not replayed and does not replay the other part. Therefore, it takes relatively short time to perform failover (failover) between the standby node and the master node, and further, it also takes relatively short time for the database system to perform fault repair, or in other words, fault repair efficiency is relatively high.

With reference to the second aspect or the first possible implementation of the second aspect, in a second possible implementation, after writing the plurality of pages into the cache queue of the GBP node, the GBP node is further configured to update the GBP recovery point and the GBP end point based on the plurality of pages. Correspondingly, the standby node is further configured to obtain an updated GBP recovery point and an updated GBP end point from the GBP node. Because the GBP node writes the plurality of pages into the cache queue of the GBP node, maintaining the GBP recovery point and the GBP end point by the GBP node can ensure that the GBP recovery point and the GBP end point can be updated in a timely manner.

With reference to the second aspect or the first possible implementation of the second aspect, in a third possible implementation, when the GBP node receives a new page that does not exist in a page buffer of the GBP node and the page buffer of the GBP node is full, the GBP node is further configured to: evict a page located in the header of the cache queue, and update the GBP start point to an LSN corresponding to a new header page of the cache queue. Correspondingly, the standby node is further configured to obtain an updated GBP start point from the GBP node. Because the GBP node writes the plurality of pages into the cache queue of the GBP node, maintaining the GBP start point by the GBP node can ensure that the GBP start point can be updated in a timely manner.

With reference to the second aspect or the first possible implementation of the second aspect, in a fourth possible implementation, when the GBP node receives a new page that does not exist in a page buffer of the GBP node, the GBP node is further configured to place the new page at the tail of the cache queue; or when the GBP node receives a new page that exists in a page buffer of the GBP node, the GBP node is further configured to: update an existing corresponding page based on the received new page, and place the updated new page at the tail of the cache queue.

It can be learned from the foregoing that pages are sequentially placed in the cache queue of the GBP node. Therefore, all redo logs between the redo log corresponding to the GBP recovery point and a redo log corresponding to the GBP end point are last redo logs in all redo logs sent by the master node to the standby node. Therefore, using this embodiment can ensure that the standby node can be synchronized with the master node after completing the replaying step.

With reference to any one of the second aspect or the first to the fourth possible implementations of the second aspect, in a fifth possible implementation, when the disk recovery point is greater than or equal to the GBP start point and the disk end point is greater than or equal to the GBP end point, the standby node is further configured to start a background thread, where the background thread is configured to pull all the pages stored on the GBP node to a page buffer of the standby node.

Optionally, the background thread is configured to pull all the pages stored on the GBP node to the page buffer of the standby node by using a second data transmission protocol.

The standby node replays only a part of redo logs, and redo logs that are not replayed do not need to be replayed because pages corresponding to the redo logs are stored on the GBP node. In this embodiment, pulling all the pages in the GBP node from the GBP node can ensure that the pages corresponding to the redo logs that are not replayed are also pulled to the standby node, so that it is ensured that the standby node can be completely synchronized with the faulty master node.

With reference to any one of the second aspect or the first to the fifth possible implementations of the second aspect, in a sixth possible implementation, after the master node is faulty, before the standby node replays the redo logs, the standby node is further configured to obtain (or locally obtain) the disk recovery point and the disk end point. The disk recovery point and the disk end point are obtained to determine whether a replaying condition is met. Only when the condition is met, the standby node can perform replaying, or in other words, fault repair efficiency of the database system provided in this application can be improved.

With reference to any one of the second aspect or the first to the sixth possible implementations of the second aspect, in a seventh possible implementation, when the master node works normally, the master node is further configured to send redo logs to the standby node. Correspondingly, the standby node is further configured to: replay the redo logs to obtain corresponding pages, and flush the pages to the local disk in batches.

With reference to any one of the second aspect or the first to the seventh possible implementations of the second aspect, in an eighth possible implementation, the master node is configured to start a page sending thread, and the page sending thread sends a plurality of pages in a sending queue to the GBP node in batches based on a sequence from a header to a tail of the sending queue by using the first data transmission protocol, where the sending queue is located in the master node, and LSNs corresponding to the plurality of pages in the sending queue are in ascending order from the header to the tail of the sending queue.

Because the LSNs corresponding to the plurality of pages in the sending queue are in ascending order, the page sending thread sends the plurality of pages to the GBP node based on the sequence from the header to the tail of the sending queue, to ensure that the GBP node also sequentially receives the pages. Specifically, an LSN of a page that is first received is less than an LSN of a page that is subsequently received. When the GBP node writes the plurality of received pages into the cache queue of the GBP node, the GBP node may write the plurality of pages into the cache queue of the GBP node based on a sequence of receiving the pages, so that LSNs of the plurality of pages in the cache queue are in ascending order based on the sequence from the header to the tail of the cache queue. In other words, using this solution can relatively simply implement a case in which the plurality of pages in the cache queue are in ascending order based on the sequence from the header to the tail of the cache queue.

With reference to the eighth possible implementation of the second aspect, in a ninth possible implementation, the master node is configured to start a plurality of page sending threads, and there is a one-to-one relationship between the plurality of page sending threads and a plurality of sending queues included in the master node. An advantage of this embodiment is that because there is a one-to-one relationship between the page sending threads and the sending queues, operations are relatively simple and are not error-prone.

With reference to any one of the second aspect or the first to the ninth possible implementations of the second aspect, in a tenth possible implementation, the GBP node is configured to start a page receiving thread, and the page receiving thread receives the plurality of pages in batches, and writes the plurality of pages into the cache queue of the GBP node.

With reference to the tenth possible implementation of the second aspect, in an eleventh possible implementation, the GBP node is configured to start a plurality of page receiving threads, there is a one-to-one relationship between the plurality of page receiving threads and a plurality of cache queues included in the GBP node, and there is a one-to-one relationship between the plurality of page sending threads started by the master node and the plurality of page receiving threads started by the GBP node. An advantage of this embodiment is that because there is a one-to-one relationship between the page receiving threads and the cache queues, and there is also a one-to-one relationship between the page sending threads and the page receiving threads, operations are relatively simple and are not error-prone.

According to a third aspect, this application provides another fault repair method for a database system. Specifically, the method includes the following steps: When a master node is faulty, determining a global buffer pool (GBP) start point, a GBP recovery point, and a GBP end point; and when a disk recovery point is greater than or equal to the GBP start point and a disk end point is greater than or equal to the GBP end point, replaying all redo logs between a redo log corresponding to the GBP recovery point and a redo log corresponding to the disk end point, so that a standby node is promoted to a new master node.

It should be noted that the GBP start point indicates a smallest log sequence number (LSN) included in all pages stored on a GBP node. The GBP recovery point indicates a smallest LSN included in a batch of pages received by the GBP node most recently. The GBP end point indicates a largest LSN included in the batch of pages received by the GBP node most recently.

It should be noted that all the pages stored on the GBP node are sent by the master node to the GBP node by using a first data transmission protocol when the master node works normally and are written into a cache queue of the GBP node by the GBP node, and LSNs corresponding to the plurality of pages are in ascending order based on a sequence from a header to a tail of the cache queue.

The disk recovery point indicates a smallest LSN included in a batch of a plurality of most recently written pages in a disk of the standby node. The disk end point indicates an LSN of a last redo log received by the standby node.

With reference to the third aspect, in a first possible implementation, none of redo logs between a redo log corresponding to the disk recovery point and the redo log corresponding to the GBP recovery point are replayed.

With reference to the third aspect or the first possible implementation of the third aspect, in a second possible implementation, when the disk recovery point is greater than or equal to the GBP start point and the disk end point is greater than or equal to the GBP end point, the method further includes: starting a background thread, where the background thread is configured to pull all the pages stored on the GBP node to a page buffer.

Optionally, the background thread is configured to pull all the pages stored on the GBP node to the page buffer by using a second data transmission protocol.

With reference to the third aspect, the first possible implementation of the third aspect, or the second possible implementation of the third aspect, in a third possible implementation, after the replaying step is completed, when a page that needs to be accessed is still located in a page buffer of the GBP node, the method further includes: reading, from the page buffer of the GBP node, the page that needs to be accessed.

With reference to any one of the third aspect or the first to the third possible implementations of the third aspect, in a fourth possible implementation, after the master node is faulty, before the replaying step is performed, the disk recovery point and the disk end point are obtained.

With reference to any one of the third aspect or the first to the fourth possible implementations of the third aspect, in a fifth possible implementation, when the master node works normally, redo logs sent by the master node are received, the redo logs are replayed to obtain corresponding pages, and the obtained pages are flushed to the local disk in batches.

It should be noted that the fault repair method in the third aspect is performed by the standby node in the fault repair method in the first aspect. Each embodiment in the third aspect is described from the perspective of the standby node. The fault repair method in the third aspect and the fault repair method in the first aspect are the same or similar in many aspects. Therefore, for beneficial effects of each embodiment in the third aspect, refer to beneficial effects of a corresponding embodiment in the first aspect. For further brevity of this application, the beneficial effects of each embodiment in the third aspect are not described again.

According to a fourth aspect, this application further provides a computing device. The computing device includes a determining unit and a replaying unit. When a master node is faulty, the determining unit is configured to determine a global buffer pool (GBP) start point, a GBP recovery point, and a GBP end point. When a disk recovery point is greater than or equal to the GBP start point and a disk end point is greater than or equal to the GBP end point, the replaying unit is configured to replay all redo logs between a redo log corresponding to the GBP recovery point and a redo log corresponding to the disk end point.

It should be explained that the GBP start point indicates a smallest log sequence number (LSN) included in all pages stored on a GBP node. The GBP recovery point indicates a smallest LSN included in a batch of pages received by the GBP node most recently. The GBP end point indicates a largest LSN included in the batch of pages received by the GBP node most recently. The disk recovery point indicates a smallest LSN included in a batch of a plurality of most recently written pages in a disk of a standby node. The disk end point indicates an LSN of a last redo log received by the standby node.

It should be noted that all the pages stored on the GBP node are sent by the master node to the GBP node by using a first data transmission protocol when the master node works normally and are written into a cache queue of the GBP node by the GBP node, and LSNs corresponding to the plurality of pages are in ascending order based on a sequence from a header to a tail of the cache queue.

With reference to the fourth aspect, in a first possible implementation, none of redo logs between a redo log corresponding to the disk recovery point and the redo log corresponding to the GBP recovery point are replayed.

With reference to the fourth aspect or the first possible implementation of the fourth aspect, in a second possible implementation, the computing device further includes a starting unit. When the disk recovery point is greater than or equal to the GBP start point and the disk end point is greater than or equal to the GBP end point, the starting unit is configured to start a background thread, where the background thread is configured to pull all the pages stored on the GBP node to a page buffer.

Optionally, the background thread is configured to pull all the pages stored on the GBP node to the page buffer by using a second data transmission protocol.

With reference to the fourth aspect, the first possible implementation of the fourth aspect, or the second possible implementation of the fourth aspect, in a third possible implementation, the computing device further includes a reading unit. After the replaying unit completes replaying the redo logs, when a page that needs to be accessed is still located in a page buffer of the GBP node, the reading unit is configured to read, from the page buffer of the GBP node, the page that needs to be accessed.

With reference to any one of the fourth aspect or the first to the third possible implementations of the fourth aspect, in a fourth possible implementation, after the master node is faulty, before the replaying unit performs the replaying step, the determining unit is further configured to obtain the disk recovery point and the disk end point.

With reference to any one of the fourth aspect or the first to the fourth possible implementations of the fourth aspect, in a fifth possible implementation, the computing device further includes a receiving unit. When the master node works normally, the receiving unit is configured to receive redo logs sent by the master node. Correspondingly, the replaying unit is configured to: replay the redo logs to obtain corresponding pages, and flush the obtained pages to a local disk in batches.

It should be noted that the computing device in the fourth aspect may perform each embodiment in the third aspect, and the computing device in the fourth aspect may implement functions of the standby node in the database system in the second aspect. Therefore, for beneficial effects of each embodiment in the fourth aspect, refer to beneficial effects of a corresponding embodiment in the second aspect. For the beneficial effects of each embodiment in the fourth aspect, details are not described again in this application.

According to a fifth aspect, this application provides another computing device. The computing device includes at least a processor and storage. The storage is configured to store a disk recovery point and a disk end point. When a master node is faulty, the processor is configured to determine a GBP start point, a GBP recovery point, and a GBP end point. When the disk recovery point is greater than or equal to the GBP start point and the disk end point is greater than or equal to the GBP end point, the processor is further configured to replay all redo logs between a redo log corresponding to the GBP recovery point and a redo log corresponding to the disk end point.

It should be noted that the GBP start point indicates a smallest LSN included in all pages stored on a GBP node. The GBP recovery point indicates a smallest LSN included in a batch of pages received by the GBP node most recently. The GBP end point indicates a largest LSN included in the batch of pages received by the GBP node most recently. The disk recovery point indicates a smallest LSN included in a batch of a plurality of most recently written pages in a disk of a standby node. The disk end point indicates an LSN of a last redo log in a memory of the standby node.

It should be noted that all the pages stored on the GBP node are sent by the master node to the GBP node by using a first data transmission protocol when the master node works normally and are written into a cache queue of the GBP node by the GBP node, and LSNs corresponding to the plurality of pages are in ascending order based on a sequence from a header to a tail of the cache queue.

With reference to the fifth aspect, in a first possible implementation, none of redo logs between a redo log corresponding to the disk recovery point and the redo log corresponding to the GBP recovery point are replayed.

With reference to the fifth aspect or the first possible implementation of the fifth aspect, in a second possible implementation, when the disk recovery point is greater than or equal to the GBP start point and the disk end point is greater than or equal to the GBP end point, the processor is further configured to start a background thread, where the background thread is configured to pull all the pages stored on the GBP node to a page buffer.

Optionally, the background thread is configured to pull all the pages stored on the GBP node to the page buffer by using a second data transmission protocol.

With reference to the fifth aspect, the first possible implementation of the fifth aspect, or the second possible implementation of the fifth aspect, in a third possible implementation, after the replaying unit completes replaying the redo logs, when a page that needs to be accessed is still located in a page buffer of the GBP node, the processor is configured to read, from the page buffer of the GBP node, the page that needs to be accessed.

With reference to any one of the fifth aspect or the first to the third possible implementations of the fifth aspect, in a fourth possible implementation, after the master node is faulty, before the replaying unit performs the replaying step, the processor is further configured to obtain the disk recovery point and the disk end point.

With reference to any one of the fifth aspect or the first to the fourth possible implementations of the fifth aspect, in a fifth possible implementation, the computing device further includes an I/O interface. When the master node works normally, the I/O interface is configured to receive redo logs sent by the master node. Correspondingly, the processor is configured to: replay the redo logs to obtain corresponding pages, and flush the obtained pages to a local disk in batches.

It should be learned that the computing device provided in each embodiment in the fifth aspect may perform the method in a corresponding embodiment in the third aspect, and the computing device in the fifth aspect and the computing device in the fourth aspect may implement same functions, in other words, the computing device in the fifth aspect may also implement functions of the standby node in the database system in the second aspect. Therefore, for beneficial effects of each embodiment in the fifth aspect, refer to beneficial effects of a corresponding embodiment in the second aspect. Details are not described herein again.

According to a sixth aspect, this application further provides a data backup method. The method includes: sending a page to a GBP node by using a remote direct memory access (RDMA) protocol in a process of transferring a redo log to a standby node, so that when a fault occurs, the fault is repaired by using the page in the GBP node.

In this embodiment, in the process of transferring the redo log to the standby node, a modified page is further sent to the GBP node by using the RDMA protocol, for backup on the GBP node. Because using the RDMA protocol can enable modified pages corresponding to most redo logs sent to the standby node to be sent to the GBP node, when a local node is faulty, remaining redo logs that are not replayed by the standby node include two parts. A first part of redo logs are all redo logs between a redo log corresponding to a disk recovery point and a redo log corresponding to a GBP recovery point, and the second part of redo logs are all redo logs between the redo log corresponding to the GBP recovery point and a redo log corresponding to a disk end point. The standby node only needs to replay the second part of redo logs to obtain corresponding pages to implement fault repair, because pages corresponding to the first part of redo logs can be directly pulled from the GBP node. It can be learned that using the data backup method provided in this embodiment can improve fault repair efficiency.

According to a seventh aspect, this application provides a computing device, configured to perform the data backup method in the sixth aspect. The computing device includes a first transmission interface and a second transmission interface. The first transmission interface is configured to transfer a redo log to a standby node. When the first transmission interface transfers the redo log to the standby node, the second transmission interface is configured to send a page to a GBP node based on a remote direct memory access (RDMA) protocol, so that when a fault occurs, the fault is repaired by using the page in the GBP node. It should be learned that using the computing device provided in this embodiment in a database system can improve fault repair efficiency of the database system.

According to an eighth aspect, this application provides another fault repair method. The method includes the following steps.

When a master node works normally, the master node sends a plurality of pages to a GBP node by using a first data transmission protocol.

The GBP node writes the plurality of pages into a cache queue of the GBP node. Log sequence numbers (LSNs) corresponding to the plurality of pages are in ascending order based on a sequence from a header to a tail of the cache queue.

When the master node is faulty, the master node determines a GBP start point, a GBP recovery point, and a GBP end point.

When a disk recovery point is greater than or equal to the GBP start point and a disk end point is greater than or equal to the GBP end point, the master node replays all redo logs between a redo log corresponding to the GBP recovery point and a redo log corresponding to the disk end point, so that the master node is restarted.

It should be noted that the GBP start point indicates a smallest LSN included in all pages stored on the GBP node. The GBP recovery point indicates a smallest LSN included in a batch of pages received by the GBP node most recently. The GBP end point indicates a largest LSN included in the batch of pages received by the GBP node most recently. The disk recovery point indicates a smallest LSN included in a batch of a plurality of most recently written pages in a local disk. The disk end point indicates an LSN of a last received redo log.

It should be explained that the embodiment corresponding to the eighth aspect is different from the embodiment corresponding to the first aspect. In the embodiment corresponding to the first aspect, after the master node is faulty, the standby node replays a part of redo logs and then is promoted to a new master node, to implement fault repair. This type of fault repair is actually a type of failover, because after the fault repair, the original standby node performs functions of the original master node instead of the original master node. However, in the embodiment corresponding to the eighth aspect, after the master node is faulty, the master node replays a part of redo logs and then is restarted, in other words, after the fault of the master node is repaired, the master node continues to perform previous functions. Briefly, in the embodiment corresponding to the first aspect, after the master node is faulty, switching is performed between the master node and the standby node, and the switched standby node is referred to as a new master node; however, in the embodiment corresponding to the eighth aspect, after the master node is faulty, the master node is restarted.

It can be learned from the foregoing that after the master node is faulty, the master node can be restarted after replaying only all the redo logs between the redo log corresponding to the GBP recovery point and the redo log corresponding to the disk end point. None of redo logs between a redo log corresponding to the disk recovery point and the redo log corresponding to the GBP recovery point are replayed. Briefly, in this embodiment, after the master node is faulty, the master node replays only a quite small part. Therefore, using the technical solution provided in this embodiment can improve fault repair efficiency of a database system.

It should be learned that the master node stores a redo log. It is known that each (adding, deleting, or modification) transaction corresponds to one redo log. In this embodiment, the master node sends such redo logs to a standby node, and sends modified pages corresponding to the redo logs to the GBP node. It should be particularly noted that the master node further locally backs up these redo logs. For example, the master node sends these redo logs to the standby node, and also caches the redo logs in a page buffer of the master node, or flushes the redo logs to the local disk, so that when the master node is faulty, the master node replays a part of these redo logs, thereby restarting the master node.

It should be explained that the fault of the master node is a software fault in this embodiment.

With reference to the eighth aspect, in a first possible implementation, none of the redo logs between the redo log corresponding to the disk recovery point and the redo log corresponding to the GBP recovery point are replayed.

It is easy to learn that in this embodiment, the master node skips all the redo logs between the redo log corresponding to the disk recovery point and the redo log corresponding to the GBP recovery point, and replays all the redo logs between the redo log corresponding to the GBP recovery point and the redo log corresponding to the disk end point. In other words, in this embodiment, the master node replays only a part but not all of logs that are not replayed. Therefore, fault repair efficiency of the database system is improved.

With reference to the eighth aspect or the first possible implementation of the eighth aspect, in a second possible implementation, when the disk recovery point is greater than or equal to the GBP start point and the disk end point is greater than or equal to the GBP end point, the fault repair method further includes: The master node starts a background thread, where the background thread is configured to pull all the pages located on the GBP node to a page buffer.

It should be learned that the background thread is configured to pull all the pages located on the GBP node to the page buffer by using the first data transmission protocol.

Optionally, the background thread may pull the pages from the GBP node to the page buffer of the master node in parallel with the replaying step, so that time can be saved and fault repair efficiency can be improved.

It should be noted that after the master node pulls all the pages stored on the GBP node to the page buffer of the master node, the master node further compares the page pulled to the page buffer of the master node with a page maintained by the master node, and retains a new page and discards an old page.

With reference to the eighth aspect, the first possible implementation of the eighth aspect, or the second possible implementation of the eighth aspect, in a third possible implementation, after the master node completes the replaying step, when a page that needs to be accessed is still located in a page buffer of the GBP node, the fault repair method further includes: The master node reads, from the page buffer of the GBP node, the page that needs to be accessed.

With reference to any one of the eighth aspect or the first to the third possible implementations of the eighth aspect, in a fourth possible implementation, after the master node is faulty, before the replaying step is performed, the fault repair method further includes: The master node locally obtains the disk recovery point and the disk end point.

With reference to any one of the eighth aspect or the first to the fourth possible implementations of the eighth aspect, in a fifth possible implementation, that the master node sends a plurality of pages to a GBP node specifically includes: The master node starts a page sending thread, and the page sending thread sends a plurality of pages in a sending queue to the GBP node in batches based on a sequence from a header to a tail of the sending queue by using the first data transmission protocol, where LSNs corresponding to the plurality of pages in the sending queue are in ascending order from the header to the tail of the sending queue.

According to a ninth aspect, a database system is provided. The database system includes a master node and a GBP node. The master node is configured to send a plurality of pages to the GBP node by using a first data transmission protocol. The GBP node is configured to write the plurality of pages into a cache queue of the GBP node. Log sequence numbers (LSNs) included in the plurality of pages are in ascending order based on a sequence from a header to a tail of the cache queue.

When the master node is faulty, the master node is further configured to determine a GBP start point, a GBP recovery point, and a GBP end point. When a disk recovery point is greater than or equal to the GBP start point and a disk end point is greater than or equal to the GBP end point, the master node is further configured to replay all redo logs between a redo log corresponding to the GBP recovery point and a redo log corresponding to the disk end point.

The GBP start point indicates a smallest LSN included in all pages stored on the GBP node. The GBP recovery point indicates a smallest LSN included in a batch of pages received by the GBP node most recently. The GBP end point indicates a largest LSN included in the batch of pages received by the GBP node most recently. The disk recovery point indicates a smallest LSN included in a batch of a plurality of most recently written pages in a local disk, and the disk end point indicates an LSN of a last received redo log.

With reference to the ninth aspect, in a first possible implementation, none of redo logs between a redo log corresponding to the disk recovery point and the redo log corresponding to the GBP recovery point are replayed.

With reference to the ninth aspect or the first possible implementation of the ninth aspect, in a second possible implementation, when the disk recovery point is greater than or equal to the GBP start point and the disk end point is greater than or equal to the GBP end point, the master node is further configured to start a background thread, where the background thread is configured to pull all the pages located on the GBP node to a page buffer.

With reference to the ninth aspect, the first possible implementation of the ninth aspect, or the second possible implementation of the ninth aspect, in a third possible implementation, after the master node completes the replaying step, when a page that needs to be accessed is still located in a page buffer of the GBP node, the master node is further configured to read, from the page buffer of the GBP node, the page that needs to be accessed.

It should be learned that the database system provided in each embodiment in the ninth aspect may perform the fault repair method in a corresponding embodiment in the eighth aspect. Therefore, for beneficial effects of each embodiment in the ninth aspect, refer to beneficial effects of the corresponding embodiment in the eighth aspect. Details are not described herein again.

According to a tenth aspect, this application further provides another fault repair method for a database system. The fault repair method includes the following steps:

during normal working, sending a plurality of pages to a GBP node by using a first data transmission protocol;

when a fault occurs, determining a GBP start point, a GBP recovery point, and a GBP end point; and when a disk recovery point is greater than or equal to the GBP start point and a disk end point is greater than or equal to the GBP end point, replaying all redo logs between a redo log corresponding to the GBP recovery point and a redo log corresponding to the disk end point.

It should be noted that the plurality of pages are written into a cache queue of the GBP node, and log sequence numbers (LSNs) corresponding to the plurality of pages are in ascending order based on a sequence from a header to a tail of the cache queue.

It should be explained that the GBP start point indicates a smallest LSN included in all pages stored on the GBP node. The GBP recovery point indicates a smallest LSN included in a batch of pages received by the GBP node most recently. The GBP end point indicates a largest LSN included in the batch of pages received by the GBP node most recently. The disk recovery point indicates a smallest LSN included in a batch of a plurality of most recently written pages in a local disk. The disk end point indicates an LSN of a last received redo log.

With reference to the tenth aspect, in a first possible implementation, none of redo logs between a redo log corresponding to the disk recovery point and the redo log corresponding to the GBP recovery point are replayed.

It is easy to learn that in this embodiment, a master node skips all the redo logs between the redo log corresponding to the disk recovery point and the redo log corresponding to the GBP recovery point, and replays all the redo logs between the redo log corresponding to the GBP recovery point and the redo log corresponding to the disk end point. In other words, in this embodiment, the master node replays only a part but not all of logs that are not replayed. Therefore, fault repair efficiency of the database system is improved.

With reference to the tenth aspect or the first possible implementation of the tenth aspect, in a second possible implementation, when the disk recovery point is greater than or equal to the GBP start point and the disk end point is greater than or equal to the GBP end point, the fault repair method further includes: starting a background thread, where the background thread is configured to pull all the pages located on the GBP node to a page buffer.

Optionally, the background thread is configured to pull all the pages located on the GBP node to the page buffer by using the first data transmission protocol.

Optionally, the background thread may pull the pages from the GBP node to the page buffer of the master node in parallel with the replaying step, so that time can be saved and fault repair efficiency can be improved.

It should be noted that after the master node pulls all the pages stored on the GBP node to the page buffer of the master node, the master node further compares the page pulled to the page buffer of the master node with a page maintained by the master node, and retains a new page and discards an old page.

With reference to the tenth aspect, the first possible implementation of the tenth aspect, or the second possible implementation of the tenth aspect, in a third possible implementation, after the replaying step is completed, when a page that needs to be accessed is still located in a page buffer of the GBP node, the fault repair method further includes: reading, from the page buffer of the GBP node, the page that needs to be accessed.

With reference to any one of the tenth aspect or the first to the third possible implementations of the tenth aspect, in a fourth possible implementation, after the master node is faulty, before the replaying step is performed, the fault repair method further includes: locally obtaining the disk recovery point and the disk end point.

With reference to any one of the tenth aspect or the first to the fourth possible implementations of the tenth aspect, in a fifth possible implementation, that a master node sends a plurality of pages to a GBP node specifically includes: The master node starts a page sending thread, and the page sending thread sends a plurality of pages in a sending queue to the GBP node in batches based on a sequence from a header to a tail of the sending queue by using the first data transmission protocol, where LSNs corresponding to the plurality of pages in the sending queue are in ascending order from the header to the tail of the sending queue.

It should be noted that the fault repair method in the tenth aspect is performed by the master node in the fault repair method in the eighth aspect. Each embodiment in the tenth aspect is described from the perspective of the master node. The fault repair method in the tenth aspect and the fault repair method in the eighth aspect are the same or similar in many aspects. Therefore, for beneficial effects of each embodiment in the tenth aspect, refer to beneficial effects of a corresponding embodiment in the eighth aspect. Details are not described herein again.

According to an eleventh aspect, this application provides another computing device. The computing device includes at least a transmission unit, a determining unit, and a replaying unit.

The transmission unit is configured to send a plurality of pages to a GBP node by using a first data transmission protocol.

When a fault occurs, the determining unit is configured to determine a GBP start point, a GBP recovery point, and a GBP end point.

When a disk recovery point is greater than or equal to the GBP start point and a disk end point is greater than or equal to the GBP end point, the replaying unit is configured to replay all redo logs between a redo log corresponding to the GBP recovery point and a redo log corresponding to the disk end point.

It should be noted that the plurality of pages are written into a cache queue of the GBP node, and LSNs corresponding to the plurality of pages are in ascending order based on a sequence from a header to a tail of the cache queue.

It should be explained that the GBP start point indicates a smallest LSN included in all pages stored on the GBP node. The GBP recovery point indicates a smallest LSN included in a batch of pages received by the GBP node most recently. The GBP end point indicates a largest LSN included in the batch of pages received by the GBP node most recently. The disk recovery point indicates a smallest LSN included in a batch of a plurality of most recently written pages in a local disk. The disk end point indicates an LSN of a last received redo log.

With reference to the eleventh aspect, in a first possible implementation, none of redo logs between a redo log corresponding to the disk recovery point and the redo log corresponding to the GBP recovery point are replayed.

With reference to the eleventh aspect or the first possible implementation of the eleventh aspect, in a second possible implementation, the computing device further includes a starting unit. When the disk recovery point is greater than or equal to the GBP start point and the disk end point is greater than or equal to the GBP end point, the starting unit is configured to start a background thread, where the background thread is configured to pull all the pages located on the GBP node to a page buffer.

Optionally, the background thread pulls all the pages located on the GBP node to the page buffer by using the first data transmission protocol.

With reference to the eleventh aspect, the first possible implementation of the eleventh aspect, or the second possible implementation of the eleventh aspect, in a third possible implementation, the computing device further includes a reading unit. After the replaying step is completed, when a page that needs to be accessed is still located on the GBP node, the reading unit is configured to read, from the GBP node, the page that needs to be accessed.

It should be learned that the computing device provided in each embodiment in the eleventh aspect may perform the fault repair method in a corresponding embodiment in the tenth aspect, and may implement functions of the master node in the database system in the eighth aspect. As described above, for the beneficial effects of each embodiment in the tenth aspect, refer to the beneficial effects of the corresponding embodiment in the eighth aspect. Therefore, for beneficial effects of each embodiment in the eleventh aspect, also refer to beneficial effects of a corresponding embodiment in the eighth aspect.

According to a twelfth aspect, this application provides another computing device. The computing device includes at least storage and a processor. The storage is configured to store a GBP start point, a GBP recovery point, a GBP end point, a disk recovery point, and a disk end point.

During normal working, the processor is configured to send a plurality of pages to a GBP node by using a first data transmission protocol. When a fault occurs, the processor is configured to determine the GBP start point, the GBP recovery point, and the GBP end point.

When the disk recovery point is greater than or equal to the GBP start point and the disk end point is greater than or equal to the GBP end point, the processor is configured to replay all redo logs between a redo log corresponding to the GBP recovery point and a redo log corresponding to the disk end point.

It should be noted that the plurality of pages are written into a cache queue of the GBP node, and LSNs corresponding to the plurality of pages are in ascending order based on a sequence from a header to a tail of the cache queue.

It should be explained that the GBP start point indicates a smallest LSN included in all pages stored on the GBP node. The GBP recovery point indicates a smallest LSN included in a batch of pages received by the GBP node most recently. The GBP end point indicates a largest LSN included in the batch of pages received by the GBP node most recently. The disk recovery point indicates a smallest LSN included in a batch of a plurality of most recently written pages in a local disk. The disk end point indicates an LSN of a last received redo log.

With reference to the twelfth aspect, in a first possible implementation, none of redo logs between a redo log corresponding to the disk recovery point and the redo log corresponding to the GBP recovery point are replayed.

With reference to the twelfth aspect or the first possible implementation of the twelfth aspect, in a second possible implementation, when the disk recovery point is greater than or equal to the GBP start point and the disk end point is greater than or equal to the GBP end point, the processor is further configured to start a background thread, where the background thread is configured to pull all the pages located on the GBP node to a page buffer.

Optionally, the background thread pulls all the pages located on the GBP node to the page buffer by using the first data transmission protocol.

With reference to the twelfth aspect, the first possible implementation of the twelfth aspect, or the second possible implementation of the twelfth aspect, in a third possible implementation, after the replaying step is completed, when a page that needs to be accessed is still located on the GBP node, the processor is further configured to read, from the GBP node, the page that needs to be accessed.

It should be learned that the computing device provided in each embodiment in the twelfth aspect may perform the fault repair method in a corresponding embodiment in the tenth aspect, and may implement functions of the master node in the database system in the eighth aspect. As described above, for the beneficial effects of each embodiment in the tenth aspect, refer to the beneficial effects of the corresponding embodiment in the eighth aspect. Therefore, for beneficial effects of each embodiment in the twelfth aspect, also refer to beneficial effects of a corresponding embodiment in the eighth aspect.

According to a thirteenth aspect, this application provides another data backup method. The data backup method includes the following steps:

receiving, by using an RDMA protocol, a plurality of pages sent by a master node;

writing the plurality of pages into a cache queue, where LSNs corresponding to the plurality of pages are in ascending order based on a sequence from a header to a tail of the cache queue; and maintaining a GBP start point, a GBP recovery point, and a GBP end point based on an LSN included in each of the plurality of pages, so that fault repair can be performed based on the GBP start point, the GBP recovery point, and the GBP end point when the master node is faulty.

The GBP start point indicates a smallest LSN included in all pages stored in a memory. The GBP recovery point indicates a smallest LSN included in a batch of most recently received pages. The GBP end point indicates a largest LSN included in the batch of most recently received pages.

It should be noted that the data backup method in this embodiment is performed by the GBP node in the database system in the ninth aspect. In this embodiment, because modified pages sent by the master node are received by using the RDMA protocol, it may be considered that the master node sends almost all modified pages to the GBP node. In this way, when the master node is faulty, there is no need to replay all remaining redo logs to obtain corresponding pages, because pages corresponding to most redo logs exist on the GBP node. Therefore, using the data backup method provided in this embodiment can improve fault repair efficiency.

With reference to the thirteenth aspect, in a first possible implementation, the GBP start point is maintained, and the data backup method further includes: when a new page that does not exist in a page buffer is received and the page buffer is full, evicting a page located in the header of the cache queue, placing the new page at the tail of the cache queue, and updating the GBP start point to an LSN corresponding to a new page located in the header of the cache queue.

In this embodiment, updating the GBP start point after the new page is written into the cache queue of the GBP node can ensure timely update of the GBP start point.

With reference to the thirteenth aspect, in a second possible implementation, the GBP recovery point and the GBP end point are maintained, and the data backup method further includes: after a new page is received, updating the GBP recovery point and the GBP end point based on an LSN corresponding to the new page.

In this embodiment, updating the GBP recovery point and the GBP end point after the new page is received and the new page is written into the cache queue of the GBP node can ensure timely update of the GBP recovery point and the GBP end point.

With reference to the thirteenth aspect, in a third possible implementation, the data backup method further includes: when a new page that does not exist in a page buffer is received, placing the new page at the tail of the cache queue; or the data backup method further includes: when a new page that exists in a page buffer is received, updating an existing corresponding page by using the new page, and placing the updated page at the tail of the cache queue.

It can be learned from this embodiment that pages are sequentially placed in the cache queue of the GBP node. Therefore, all redo logs between a redo log corresponding to the GBP recovery point and a redo log corresponding to the GBP end point are last redo logs in all redo logs sent by the master node to a standby node.

With reference to any one of the thirteenth aspect or the first to the third possible implementations of the thirteenth aspect, in a fourth possible implementation, the data backup method further includes: receiving a plurality of redo logs, and replaying the plurality of redo logs to obtain a page corresponding to each of the plurality of redo logs.

Optionally, after the page corresponding to each of the plurality of redo logs is obtained, obtained pages are further flushed to a local disk in batches.

It can be learned that in this embodiment, the GBP node may further implement functions of the standby node.

According to a fourteenth aspect, this application provides another computing device. The computing device includes at least a receiving unit, a writing unit, and a maintenance unit.

The receiving unit is configured to receive a plurality of pages by using an RDMA protocol.

The writing unit is configured to write the plurality of pages into a cache queue. LSNs corresponding to the plurality of pages are in ascending order based on a sequence from a header to a tail of the cache queue.

The maintenance unit is configured to maintain a GBP start point, a GBP recovery point, and a GBP end point based on an LSN included in each of the plurality of pages, so that fault repair can be performed based on the GBP start point, the GBP recovery point, and the GBP end point when a master node is faulty.

The GBP start point indicates a smallest LSN included in all pages stored in a memory. The GBP recovery point indicates a smallest LSN included in a batch of most recently received pages. The GBP end point indicates a largest LSN included in the batch of most recently received pages.

With reference to the fourteenth aspect, in a first possible implementation, when a new page that does not exist in a page buffer is received and the page buffer is full, the maintenance unit is further configured to: evict a page located in the header of the cache queue, and update the GBP start point to an LSN corresponding to a new page located in the header of the cache queue.

With reference to the fourteenth aspect, in a second possible implementation, when a new page is received, the maintenance unit is further configured to update the GBP recovery point and the GBP end point based on an LSN corresponding to the new page.

With reference to the fourteenth aspect, in a third possible implementation, when a new page that does not exist in a page buffer is received, the writing unit is further configured to place the new page at the tail of the cache queue. When a new page that exists in the page buffer is received, the writing unit is further configured to: update an existing corresponding page by using the new page, and place the updated page at the tail of the cache queue.

With reference to any one of the fourteenth aspect or the first to the third possible implementations of the fourteenth aspect, in a fourth possible implementation, the computing device further includes a replaying unit. It should be noted that the receiving unit is further configured to receive a plurality of redo logs. Correspondingly, the replaying unit is configured to replay the plurality of redo logs to obtain a page corresponding to each of the plurality of redo logs.

It should be learned that the computing device provided in each embodiment in the fourteenth aspect may perform the data backup method in a corresponding embodiment in the thirteenth aspect. Therefore, for beneficial effects of each embodiment in the fourteenth aspect, refer to beneficial effects of the corresponding embodiment in the thirteenth aspect.

According to a fifteenth aspect, this application provides another computing device. The computing device includes at least an I/O interface and a processor. The I/O interface is configured to receive a plurality of pages by using an RDMA protocol.

The processor is configured to: write the plurality of pages into a cache queue, and maintain a GBP start point, a GBP recovery point, and a GBP end point based on an LSN included in each of the plurality of pages, so that fault repair can be performed based on the GBP start point, the GBP recovery point, and the GBP end point when a master node is faulty.

It should be noted that LSNs corresponding to the plurality of pages are in ascending order based on a sequence from a header to a tail of the cache queue.

It should be noted that the GBP start point indicates a smallest LSN included in all pages stored in a memory. The GBP recovery point indicates a smallest LSN included in a batch of most recently received pages. The GBP end point indicates a largest LSN included in the batch of most recently received pages.

With reference to the fifteenth aspect, in a first possible implementation, when a new page that does not exist in a page buffer is received and the page buffer is full, the processor is further configured to: evict a page located in the header of the cache queue, and update the GBP start point to an LSN corresponding to a new page located in the header of the cache queue.

With reference to the fifteenth aspect, in a second possible implementation, when a new page is received, the processor is further configured to update the GBP recovery point and the GBP end point based on an LSN corresponding to the new page.

With reference to the fifteenth aspect, in a third possible implementation, when a new page that does not exist in a page buffer is received, the processor is further configured to place the new page at the tail of the cache queue. When a new page that exists in the page buffer is received, the processor is further configured to: update an existing corresponding page by using the new page, and place the updated page at the tail of the cache queue.

With reference to any one of the fifteenth aspect or the first to the third possible implementations of the fifteenth aspect, in a fourth possible implementation, it should be noted that the I/O interface is further configured to receive a plurality of redo logs. Correspondingly, the processor is further configured to: replay the plurality of redo logs to obtain a page corresponding to each of the plurality of redo logs, and flush obtained pages to a local disk in batches.

It should be learned that the computing device provided in each embodiment in the fourteenth aspect may perform the data backup method in a corresponding embodiment in the thirteenth aspect. Therefore, for beneficial effects of each embodiment in the fourteenth aspect, refer to beneficial effects of the corresponding embodiment in the thirteenth aspect.

BRIEF DESCRIPTION OF DRAWINGS

FIG. 4 is a flowchart of a fault repair method for a database system according to this application;

FIG. 5 is a schematic diagram of a structure when a master node sends a page to a GBP node;

FIG. 10 is a flowchart of another fault repair method for a database system according to this application;

FIG. 11A is a structural diagram of a computing device according to this application;

FIG. 11B is a structural diagram of another computing device according to this application;

FIG. 16 is a flowchart of another fault repair method for a database system according to this application;

FIG. 17 is a structural diagram of another computing device according to this application;

DESCRIPTION OF EMBODIMENTS

Before the embodiments of this application are described, some nouns appearing in the document of this application are first explained.

WAL protocol: also referred to as a write ahead redo log. To ensure durability and consistency of transaction modification, redo logs are sequentially flushed to a disk to ensure durability of page modification. After the redo logs are flushed to the disk, even if a master node is shut down, a standby node can be restored, by replaying the redo logs, to a same state as the master node existing before the shutdown.

Dirty page: Page located in a data buffer (data buffer). If a page is modified after being read from the disk, such a page is referred to as a dirty page. The dirty page is a concept in the data buffer. In this application, a modified page is referred to as a dirty page when being located in a data buffer of the master node, and a page written into a global buffer pool (global buffer pool, GBP) node from the master node is referred to as a modified page.

Recovery time objective (recovery time objective, RTO): Length of time that a customer allows for service interruption. For example, if a service needs to be recovered within half a day after a disaster occurs, the RTO is 12 hours.

Log sequence number (LSN): Each log has a unique LSN, or in other words, there is a one-to-one relationship between logs and LSNs. Therefore, a log can be uniquely determined based on the LSN. It should be noted that because each log corresponds to one modified page (namely, a page sent by the master node to the GBP node, which is simply referred to as a page below), each page also includes only one LSN, and there is also a one-to-one relationship between pages and LSNs. Therefore, "LSN corresponding to a page", "LSN included in a page", and "LSN that a page has" mentioned in this application have a same meaning.

Disk recovery point: Smallest log sequence number (LSN) included in a batch of most recently written data pages in a local disk.

Disk end point: LSN of a last redo log in the local disk.

Figure 1:
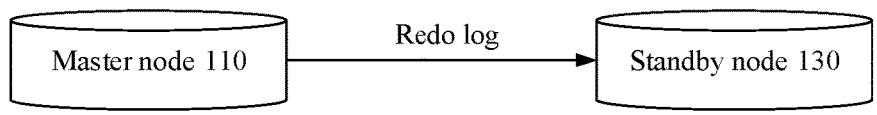
FIG. 1 is an architectural diagram of a database system.
Figure 2:
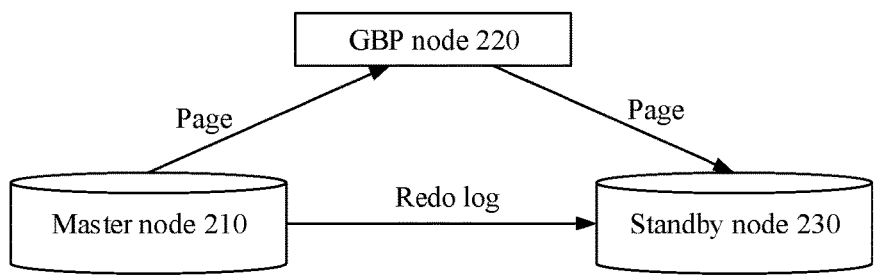
FIG. 2 is an architectural diagram of a database system according to this application.

An embodiment of this application provides a first fault repair method for a database system (simply referred to as a "first fault repair method"). Specifically, the first fault repair method may be applied to a database system shown in FIG. 2. As shown in FIG. 2, the database system includes a master (master) node 210, a GBP node 220, and a standby (standby) node 230. The master node 210 and the GBP node 220 perform data transmission by using a first data transmission protocol.

It should be noted that the first data transmission protocol is a data transmission protocol with a low latency and a high throughput. Optionally, the first data transmission protocol is a remote direct memory access (remote direct memory access, RDMA) protocol. In this case, the master node 210 has a 10-Gigabit Ethernet card or an infiniBand (infiniBand) adapter that supports the RDMA protocol.

The RDMA protocol features a low latency (for example, the latency is less than or equal to 10 µs) and no need of direct participation of a CPU. In this embodiment, a modified page in the master node 210 may be remotely written into a page buffer (or a memory) of the GBP node 220 based on the RDMA protocol.

It should be noted that the modified page is written into the page buffer of the GBP node 220 in a remote atomic write manner. In other words, the modified page is written into the GBP node 220 in a form of an atom. One atom usually includes a plurality of modified pages, and therefore a plurality of modified pages are written into the page buffer of the GBP node 220 after making up one atom.

In addition, a page that originates from the master node 210 and that is written into the GBP node 220 is certainly a modified page in the master node 210. Therefore, for brevity of description, such a page is simply referred to as a page in many descriptions of this application.

Optionally, the first data transmission protocol may be 40 G Ethernet (40 GE).

Before descriptions of this embodiment, it is first necessary to clarify a meaning of a checkpoint (checkpoint). The checkpoint is a database event, and the checkpoint exists fundamentally for reduction of crash recovery (crash recovery) time. A database has a checkpoint (checkpoint) mechanism. Based on the checkpoint mechanism, dirty pages are continuously flushed from a memory to a local disk by using one or more background threads. Due to a speed limitation of the local disk, dirty pages are flushed from the memory to the local disk at a relatively low speed. A last page flushed to the disk corresponds to a disk recovery point. Because dirty pages are flushed to the disk at a relatively low speed, there are a large quantity of redo logs between a redo log corresponding to the disk recovery point and a redo log corresponding to a disk end point, and dirty pages corresponding to the redo logs are not flushed to the disk. When the master node is faulty and needs to be recovered, because dirty pages corresponding to a large quantity of redo logs are not flushed to the disk, the large quantity of redo logs need to be replayed. It is easy to learn that the checkpoint is mainly used to continuously flush dirty pages to the local disk and advance the disk recovery point, to reduce a quantity of redo logs that need to be recovered and an RTO when the database is crashed and needs to be recovered.

Figure 3:
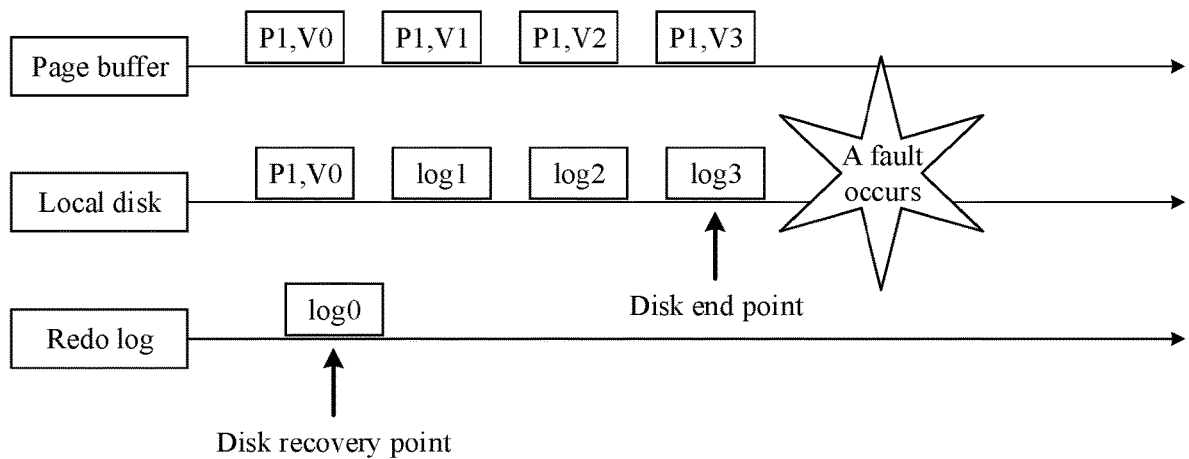
FIG. 3 is a schematic diagram of a checkpoint mechanism.

FIG. 3 shows a function of the checkpoint mechanism when the database is faulty and needs to be repaired. Specifically, as shown in FIG. 3, a page P1 is sequentially modified from a V0 version to V1, V2, and V3 versions, a correspondingly generated redo log is log 1 when the page P1 is modified from V0 to V1, a correspondingly generated redo log is log 2 when the page P1 is modified from V1 to V2, and a correspondingly generated redo log is log 3 when the page P1 is modified from V2 to V3. According to the WAL protocol, when each modification transaction is committed (committed), the master node flushes only a corresponding redo log to the local disk while a page is flushed to the disk in the background. It is assumed that the node is faulty and needs to be recovered after the V0 version of P1 is flushed to the disk. As shown in FIG. 3, a redo log corresponding to the disk recovery point is log 0. Therefore, all redo logs occurring after log0 need to be sequentially replayed starting from log 0. Assuming that the redo logs that need to be sequentially replayed are log 1, log 2, and log 3, after all the redo logs that need to be replayed are replayed, a version of P1 is restored to V3, in other words, the page is restored to a state before the fault.

Optionally, in this embodiment, there is a shared nothing (shared nothing) architecture between the master node 210 and the standby node 230. The shared nothing architecture is a distributed computing architecture. Each node (node) in this architecture is independent, in other words, each node has a CPU/memory/hard disk or the like of the node, and there is no shared resource.

It should be noted that in the database system in this embodiment, a key apparatus that can implement quick recovery of the database system is the GBP node 220. The GBP node may be a device on which an application that can implement a global page cache function is installed. For ease of description, "an application that can implement a global page cache function" is referred to as "a target application" below. In this embodiment, the target application may be deployed on any device other than the master node 210 and the standby node 230, and the any other device on which the target application is deployed is the GBP node 220. It should be noted that in this embodiment, a location into which the master node 210 writes a modified page and a location from which the standby node 230 obtains the page are further configured based on a location of the device on which the target application is deployed.

In this embodiment, after a relationship is established between the master node 210 and the standby node 230, the master node 210 and the standby node 230 are separately connected to the GBP node based on respective configuration information. The master node 210 and the GBP node 220 are connected by using the first data transmission protocol. When the master node 210 works normally, heartbeats need to be maintained between the standby node 230 and the master node 210 and between the GBP node 220 and the master node 210. When the master node 210 is faulty (crashed) to cause the database system to be faulty, failover is performed between the master node 210 and the standby node 230. After the failover, the standby node 230 is promoted to a new master node, so that the fault of the database system is repaired.

The following describes in detail the first fault repair method in this embodiment. FIG. 4 is a schematic flowchart of the first fault repair method. Specifically, the first fault repair method includes the following steps.

S101. When the master node works normally, the master node sends a plurality of pages to the GBP node by using the first data transmission protocol.

In this embodiment, when the master node works normally, the master node further sends redo logs corresponding to all modification transactions to the standby node. Correspondingly, the standby node replays these redo logs to obtain corresponding pages, and flushes these pages to a local disk of the standby node in batches.

It should be noted that the redo logs are also transferred from the master node to the standby node in batches. For example, a batch of redo logs may be 8 MB.

When the database system in this embodiment includes a plurality of standby nodes, the master node usually needs to send the redo logs to N/2 (round up) standby nodes, where N is an integer greater than 1.

In a specific implementation of this embodiment, the master node starts a page sending thread, and the page sending thread sends a plurality of pages in a sending queue to the GBP node in batches based on a sequence from a header to a tail by using the first data transmission protocol. The sending queue is located in the master node, and LSNs corresponding to the plurality of pages in the sending queue are in ascending order from the header to the tail of the sending queue.

Further, the master node may start a plurality of page sending threads, and there is a one-to-one relationship between the plurality of page sending threads and a plurality of sending queues included in the master node.

It should be noted that when the master node includes a plurality of sending queues, a sending queue in which a modified page is to be placed may be determined based on a hash algorithm. A plurality of pages placed in a same sending queue (for example, a sending queue Q) may be placed in the sending queue Q based on a sequence of modifying the plurality of pages. Specifically, in a same sending queue, LSNs of a plurality of pages are in ascending order from a header to a tail. In other words, in a same sending queue, a page that is first modified is located before a page that is subsequently modified. It should be learned that the LSNs of the plurality of pages are also determined based on the sequence of modifying the plurality of pages, and an LSN of a page that is first modified is less than an LSN of a page that is subsequently modified.

S102. The GBP node writes the plurality of pages into a cache queue of the GBP node.

LSNs corresponding to the plurality of pages are in ascending order based on a sequence from a header to a tail of the cache queue.

A page buffer of the GBP node includes one or more cache queues. Each cache queue includes a plurality of pages, and LSNs included in a plurality of pages in a same cache queue are in ascending order based on a sequence of writing the plurality of pages into the cache queue (or based on a sequence from a header to a tail of the cache queue).

Optionally, the GBP node starts a page receiving thread, and the page receiving thread receives the plurality of pages in batches, and writes the plurality of pages into the cache queue of the GBP node.

Further, the GBP node may start a plurality of page receiving threads, and there is a one-to-one relationship between the plurality of page receiving threads and a plurality of cache queues included in the GBP node.

Still further, there is a one-to-one relationship between the plurality of page sending threads started by the master node and the plurality of page receiving threads started by the GBP node. In this case, it is easy to learn that there is also a one-to-one correspondence between sending queues located on the master node and cache queues located on the GBP node, and a page in each sending queue is stored in a corresponding cache queue after being sent by a corresponding page sending thread and received by a corresponding page receiving thread. As shown in FIG. 5, a master node 200 includes sending queues 1 to 3, and further starts page sending threads 1 to 3. The page sending thread 1 is configured to send a page in the sending queue 1, the page sending thread 2 is configured to send a page in the sending queue 2, and the page sending thread 3 is configured to send a page in the sending queue 3. Further, as shown in FIG. 5, a GBP node 300 starts page receiving threads 1 to 3, and further includes cache queues 1 to 3. A page received by the page receiving thread 1 is placed in the cache queue 1, a page received by the page receiving thread 2 is placed in the cache queue 2, and a page received by the page receiving thread 3 is placed in the cache queue 3. In the embodiment corresponding to FIG. 5, the page in the sending queue 1 is placed in the cache queue 1 after being sent by the page sending thread 1 to the page receiving thread 1. The page in the sending queue 2 is placed in the cache queue 2 after being sent by the page sending thread 2 to the page receiving thread 2. Alternatively, the page in the sending queue 3 is placed in the cache queue 3 after being sent by the page sending thread 3 to the page receiving thread 3.

In this embodiment, a rate at which the master node writes modified pages into the GBP node by using the first data transmission protocol is far greater than a rate at which the standby node generates the corresponding modified pages by replaying redo logs and flushes the modified pages to the local disk. Therefore, a quantity of modified pages stored on the GBP node is far greater than a quantity of modified pages flushed to the local disk of the standby node, so that when the master node is faulty and the database system needs to be repaired, a first part of pages can be directly pulled from the GBP node to a page buffer of the standby node, and the standby node only needs to replay redo logs corresponding to a second part of pages and obtain the second part of pages. Therefore, using this embodiment can improve repair efficiency of the database system.

It should be noted that for further clarity and brevity of description, in this application, all pages between a page including a disk recovery point and a page including a disk end point are classified into the first part of pages and the second part of pages. Specifically, the first part of pages are all pages between the page including the disk recovery point and a page including a GBP recovery point, or modified pages corresponding to all redo logs between a redo log corresponding to the disk recovery point and a redo log corresponding to the GBP recovery point. The second part of pages are all pages between the page including the GBP recovery point and a page including the disk end point, or modified pages corresponding to all redo logs between the redo log corresponding to the GBP recovery point and a redo log corresponding to the disk end point.

The first part of pages may include the page including the disk recovery point, or may not include the page including the disk recovery point. The first part of pages may include the page including the GBP recovery point, or may not include the page including the GBP recovery point.

When the first part of pages include the page including the GBP recovery point, the second part of pages may not include the page including the GBP recovery point, or certainly, may include the page including the GBP recovery point. When the first part of pages do not include the page including the GBP recovery point, the second part of pages include the page including the GBP recovery point. It should be learned that the second part of pages include the page including the disk end point.

S103. When the master node is faulty, the standby node determines a GBP start point, a GBP recovery point, and a GBP end point.

The GBP start point indicates a smallest LSN included in all pages stored on the GBP node. The GBP recovery point indicates a smallest LSN included in a batch of pages received by the GBP node most recently. The GBP end point indicates a largest LSN included in the batch of pages received by the GBP node most recently.

Optionally, the GBP node maintains the GBP start point, the GBP recovery point, and the GBP end point, and the standby node obtains the three points from the GBP node.

Specifically, after receiving a new page, the GBP node updates the GBP recovery point and the GBP end point.

In a specific implementation of this embodiment, when the GBP node receives a new page and the new page does not exist in the page buffer of the GBP node, the GBP node places the new page at the tail of the cache queue.

In another specific implementation of this embodiment, when the GBP node receives a new page and the new page exists in the page buffer of the GBP node, the GBP node updates an existing corresponding page based on the received new page, and places the updated new page at the tail of the cache queue, or the GBP node deletes an existing corresponding page, and places the new page at the tail of the cache queue.

It should be explained that the "new page" is a page currently received by the GBP node. For example, if the page currently received by the GBP node is a page M, the page M is a "new page". Correspondingly, if the page M does not exist in the page buffer of the GBP node before the page M is received, the page M is placed at a tail of one of cache queues. On the contrary, if the page M exists in the page buffer of the GBP node before the page M is received (the page M is located in a cache queue R), an LSN included in the existing page M is K, and an LSN included in the currently received page M is T, where both K and T are integers greater than or equal to 0, and T is greater than K, the GBP node updates the existing page M by using the currently received page M, and places the updated page M at a tail of the cache queue R, or discards the existing page M, and places the currently received page M at a tail of the cache queue R.

It should be learned that when the page M does not exist in the page buffer of the GBP node before the page M is received, a cache queue in which the page M is to be placed may be determined by using a hash algorithm, or may be determined by using another method.

In this embodiment, whether the new page exists in the page buffer of the GBP node may be determined by the GBP node or the master node.

It should be noted that in this embodiment, when the GBP node receives a new page that does not exist in the page buffer of the GBP node, the new page does not exist in the page buffer of the GBP node, and the page buffer of the GBP node is full, the GBP node evicts a page located in the header of the cache queue, and updates the GBP start point to an LSN corresponding to a new header page of the cache queue. For example, if a page currently received by the GBP node is a page Y, and the page Y does not exist in the page buffer of the GBP node, the GBP node evicts a page located in the header of the cache queue, and places the page Y at the tail of the cache queue, where the GBP start point is updated (or advanced) to an LSN corresponding to a new header page of the cache queue.

It should be noted that when the standby node obtains the GBP start point, the GBP recovery point, and the GBP end point from the GBP node, the standby node obtains a most recently updated GBP start point, GBP recovery point, and GBP end point.

The GBP node usually receives pages from the master node in batches (batches). For example, a batch of pages may include a maximum of 100 pages and a minimum of one page. For example, a background thread of the master node sends a batch of pages to the GBP node every 5 ms. If the master node includes M (M is an integer greater than 100) to-be-sent pages, the background thread of the master node continuously performs sending for M/100 (round up) times. If the master node includes only one page, the background thread of the master node sends only one page to the GBP node.

It should be noted that the batch of pages received by the GBP node most recently may include one or more pages. Certainly, when the batch of pages received by the GBP node most recently includes a plurality of pages, a quantity of the plurality of pages is not greater than a maximum quantity (for example, 100) of pages allowed to be sent at a time.

Figure 6:
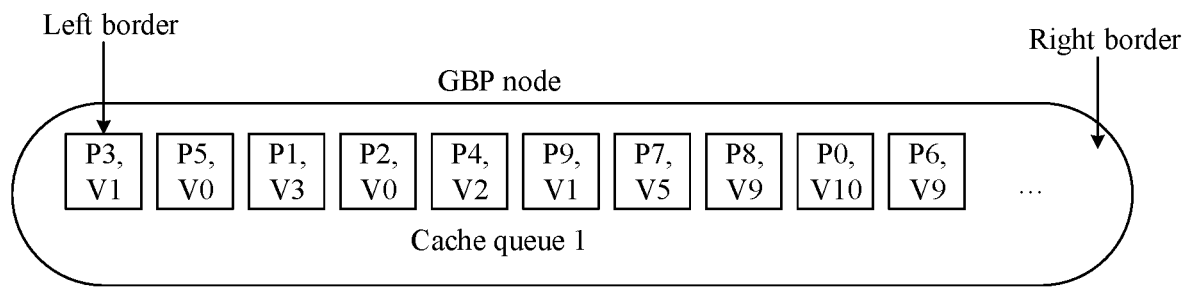
FIG. 6 is a schematic diagram of a cache queue in a GBP node.

With reference to the foregoing descriptions, it is easy to learn that each time the GBP node receives a batch of pages from the master node, the GBP node manages the batch of pages based on a cache eviction algorithm of a sliding window, or more accurately, manages all pages in the cache queue of the GBP node based on a cache eviction algorithm of a sliding window. Specifically, assuming that the cache queue of the GBP node is a window (FIG. 6 is a schematic diagram of a cache queue in the GBP node, where for example, the cache queue is a cache queue 1), when the GBP node receives a new page and needs to write the new page into the cache queue 1 and the cache queue 1 is not full, a right border of the cache queue 1 needs to be maintained; or when the GBP node receives a new page and needs to write the new page into the cache queue 1 and the cache queue 1 is full, because a page located in a header of the cache queue 1 needs to be evicted, a left border of the cache queue 1 needs to be maintained.

Figure 7A:
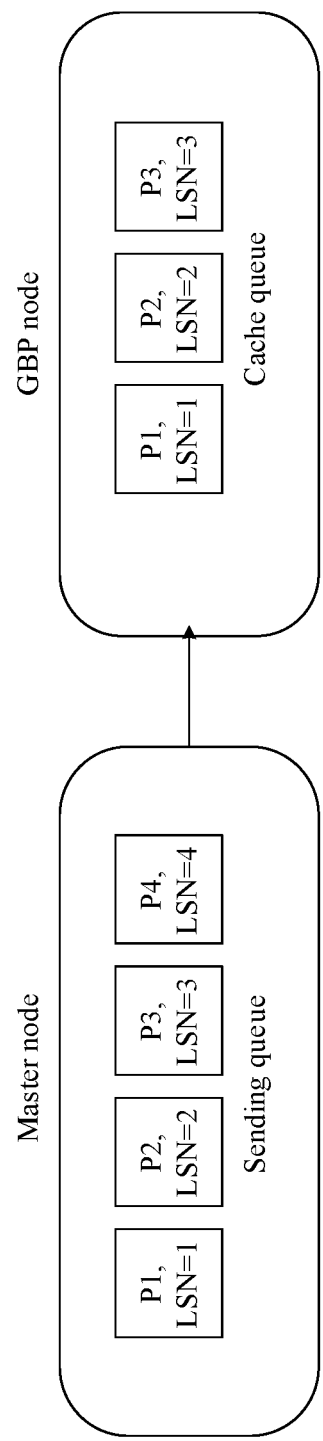
FIG. 7A to FIG. 7C are diagrams of change processes of a GBP start point, a GBP recovery point, and a GBP end point when a master node sends a page to a GBP node.
Figure 7B:
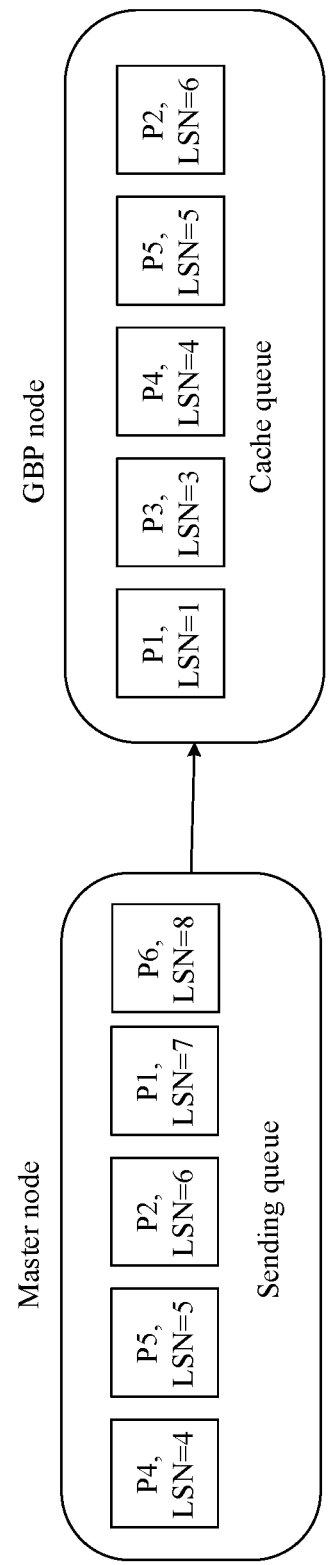
Figure 7C:
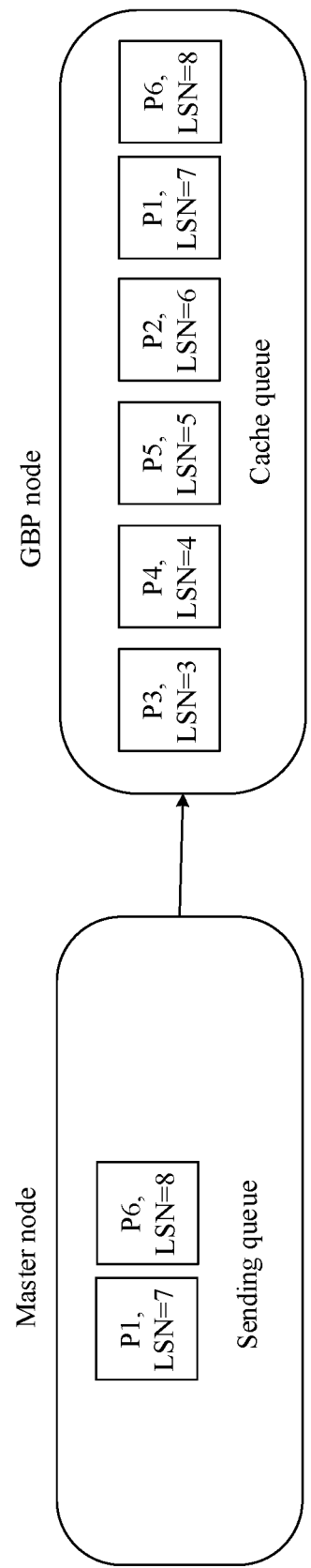

FIG. 7A to FIG. 7C show how the GBP node manages pages stored in the cache queue of the GBP node based on the cache eviction algorithm of the sliding window and how the GBP node maintains the GBP start point, the GBP recovery point, and the GBP end point each time the GBP node receives a batch of pages.

It should be noted that in the embodiments shown in FIG. 7A to FIG. 7C, there are no more than three (that is, batch=3) pages sent by the master node to the GBP node each time.

As shown in FIG. 7A, a sending queue sequentially includes four modified pages from a header to a tail: a page 1 (P1), a page 2 (P2), a page 3 (P3), and a page 4 (P4). Because batch=3, P1, P2, and P3 in the sending queue this time (it is assumed that this time is the first time) are transferred from the master node to the GBP node. It is assumed that an LSN of P1 is 1, an LSN of P2 is 2, and an LSN of P3 is 3.

After the first sending is completed, both a GBP start point and a GBP recovery point are 1, and a GBP end point is 3.

As shown in FIG. 7B, a sending queue sequentially includes five modified pages from a header to a tail: a page 4 (P4), a page 5 (P5), P2, P1, and a page 6 (P6). Because batch=3, P4, P5, and P2 in the sending queue this time (it is assumed that this time is the second time) are transferred from the master node to the GBP node. It is assumed that an LSN of P4 is 4, an LSN of P5 is 5, and an LSN of P2 is 6. It is easy to learn that during the first sending, the LSN of P2 is 2, but during the second sending, the LSN of P2 is refreshed to 6. The reason for this case is that P2 is modified, and therefore the LSN corresponding to P2 becomes larger.

After the second sending is completed, a GBP start point is 1, a GBP end point is 6, and a GBP recovery point is 4.

As shown in FIG. 7C, a sending queue sequentially includes the page 1 and the page 6 from a header to a tail. Because batch=3, the page 1 and the page 6 in the sending queue this time (it is assumed this time is the third time) are transferred from the master node to the GBP node. It is assumed that an LSN of the page 1 is 7, and an LSN of the page 6 is 8. It is easy to learn that during the first sending, the LSN of the page 1 is 1, but during the third sending, the LSN of the page 1 is refreshed to 7. The reason for this case is that the page 1 is modified, and therefore the LSN corresponding to the page 1 becomes larger.

After the third sending is completed, a GBP start point is 3, a GBP end point is 8, and a GBP recovery point is 7.

S105. When a disk recovery point is greater than or equal to the GBP start point and a disk end point is greater than or equal to the GBP end point, the standby node replays all redo logs between a redo log corresponding to the GBP recovery point and a redo log corresponding to the disk end point, so that the standby node is switched to a new master node, thereby implementing fault repair of the database system.

The disk recovery point indicates a smallest LSN included in a batch of a plurality of most recently written pages in the disk of the standby node. The disk end point indicates an LSN of a last redo log received by the standby node.

When the disk recovery point is greater than or equal to the GBP start point and the disk end point is greater than or equal to the GBP end point, the standby node further starts a background thread, where the background thread is configured to pull all the pages stored on the GBP node to the page buffer of the standby node. Subsequently, the standby node further starts a background thread to flush these pages from the page buffer of the standby node to the local disk of the standby node.

It should be noted that the standby node may be promoted to the master node without waiting for all the pages located on the GBP node to be pulled to the page buffer of the standby node, and the page pulling may be asynchronously completed in the background.

Optionally, the standby node starts the background thread almost at the same time when the standby node starts to perform the replaying step (S105).

In addition, the "new master node" mentioned in step S105 is intended to be distinguished from the original master node in this embodiment. It should be learned that after the first fault repair method is completed, the standby node (or the original standby node) is promoted (or switched) to the new master node.

Optionally, the background thread is configured to pull all the pages stored on the GBP node to the page buffer of the standby node by using a second data transmission protocol.

It should be noted that the second data transmission protocol may be a data transmission protocol with a low latency and a high throughput. Optionally, the first data transmission protocol and the second data transmission protocol may be the same.

Optionally, the second data transmission protocol is an RDMA protocol. In this case, the standby node has a 10-Gigabit Ethernet card or an infiniBand (infiniBand) adapter that supports the RDMA protocol.

Optionally, the second data transmission protocol may be 40 G Ethernet (40 GE).

It can be learned from the foregoing that both the first data transmission protocol and the second data transmission protocol may be the RDMA protocol, or both are the 40 GE. One of the first data transmission protocol and the second data transmission protocol may be the RDMA protocol, and the other is the 40 GE. For example, the first data transmission protocol is the RDMA protocol, and the second data transmission protocol is the 40 GE.

Figure 8:
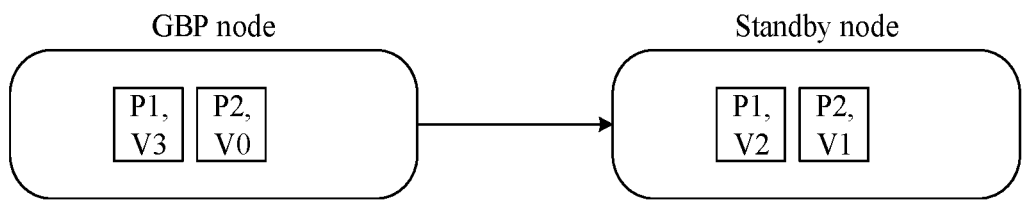
FIG. 8 is a structural diagram of pulling a page from a GBP node to a standby node.

After pulling all the pages stored on the GBP node to the page buffer of the standby node by using the second data transmission protocol, the standby node further compares the page pulled to the page buffer with a page maintained by the standby node, and discards an old page and retains a new page. As shown in FIG. 8, if a version of P1 pulled from the GBP node is V3, and a version of P1 maintained by the standby node is V2, the standby node discards V2 and retains V3. In addition, as shown in FIG. 8, if a version of P2 pulled from the GBP node is V0, and a version of P2 maintained by the standby node is V1, the standby node discards V0 and retains V1. It should be learned that in a process in which the standby node performs the replaying step (S105), a version of a page pulled from the GBP node is usually later than a version of the page maintained by the standby node, and after the standby node completes the replaying step (S105), a version of a page maintained by the standby node is later than a version of the page pulled from the GBP node, or is the same as a version of the page pulled from the GBP node.

The version of the page maintained by the standby node may be generated by the standby node by replaying a redo log, or may be directly read from the local disk of the standby node.

It should be learned that after the master node is faulty, before the standby node performs the replaying step, the standby node further locally obtains the disk recovery point and the disk end point. Certainly, the disk recovery point and the disk end point are obtained to determine whether the condition defined in step S105 is met.

It should be noted that in this embodiment, after the standby node completes replaying all the redo logs between the redo log corresponding to the GBP recovery point and the redo log corresponding to the disk recovery point, the standby node may be switched (promoted) to the new master node, in other words, fault repair of the database system in this embodiment is completed. Therefore, efficiency of switching (promoting) the standby node to the new master node is related only to a rate at which the standby node replays all the redo logs between the redo log corresponding to the GBP recovery point and the redo log corresponding to the disk recovery point, and is independent of a rate at which all the pages stored on the GBP node are pulled to the page buffer of the standby node. Therefore, pulling all the pages stored on the GBP node to the page buffer of the standby node may be asynchronously completed in the background of the standby node.

Figure 9:
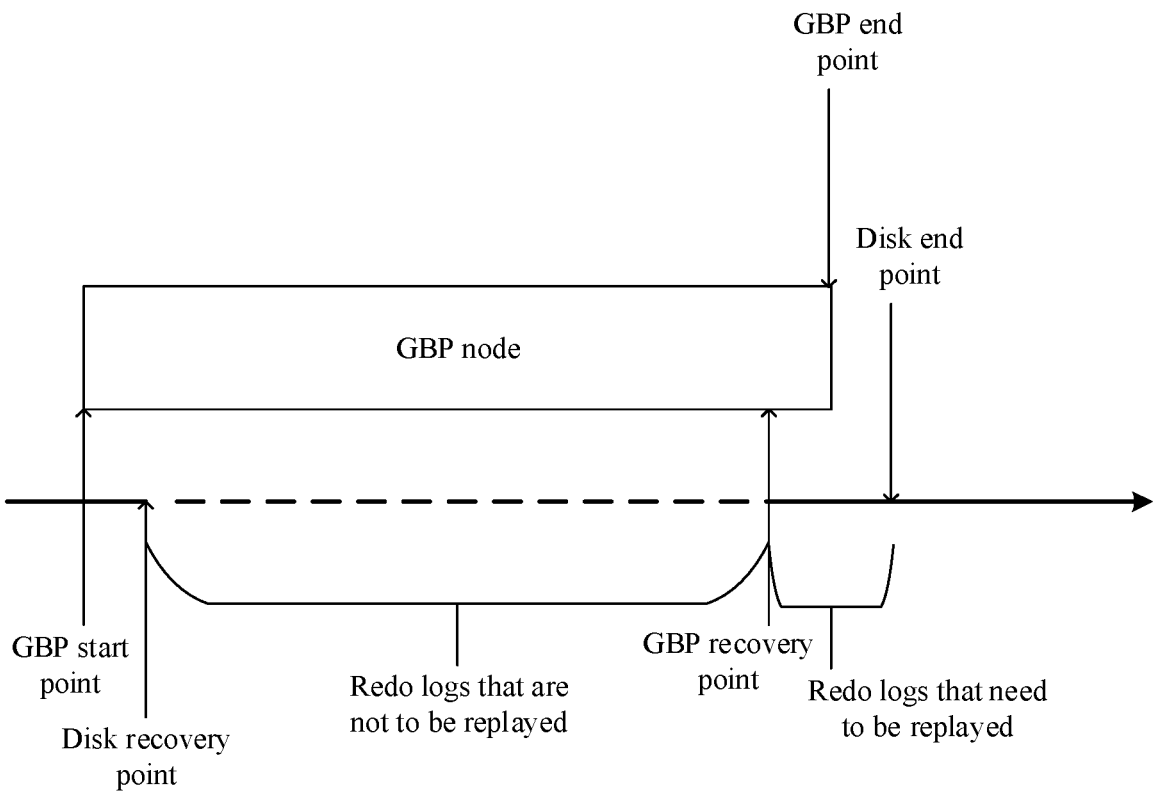
FIG. 9 is a structural diagram of distribution of redo logs in a fault repair method for a database system according to this application.

It should be noted that in this embodiment, the standby node replays only all the redo logs between the redo log corresponding to the GBP recovery point and the redo log corresponding to the disk end point, and replays none of redo logs between a redo log corresponding to the disk recovery point and the redo log corresponding to the GBP recovery point (as shown in FIG. 9). In other words, in this embodiment, the standby node skips all the redo logs between the redo log corresponding to the disk recovery point and the redo log corresponding to the GBP recovery point, and replays only all the redo logs between the redo log corresponding to the GBP recovery point and the redo log corresponding to the disk end point. In comparison with a technical solution in which all redo logs between the redo log corresponding to the disk recovery point and the redo log corresponding to the disk end point need to be replayed, in this embodiment, because the standby node needs to replay a relatively small quantity of redo logs, using this embodiment can improve efficiency of switching the standby node to the new master node, in other words, can improve fault repair efficiency of the database system.

It should be noted that in this embodiment, after the master node is faulty, the standby node no longer continues to replay remaining redo logs that are not replayed, but determines the GBP start point, the GBP recovery point, the GBP end point, the disk recovery point, and the disk end point, then compares values of the disk recovery point and the GBP start point, compares values of the disk end point and the GBP end point, and replays all the redo logs between the redo log corresponding to the GBP recovery point and the redo log corresponding to the disk end point when the disk recovery point is greater than or equal to the GBP start point and the disk end point is greater than or equal to the GBP end point, to implement failover or implement fault repair of the database system. Briefly, in this embodiment, after the master node is faulty, the standby node replays only a quite small part of all the remaining redo logs that are not replayed. Therefore, using the technical solution provided in this embodiment can improve efficiency of recovering the database system.

Optionally, after the standby node completes the replaying step, or after the fault repair method is completed and the standby node is promoted to the new master node, if a page that needs to be accessed by an application on the standby node is still located in the page buffer of the GBP node, the application reads, from the page buffer of the GBP node, the page that needs to be accessed.

It should be learned that after the standby node is switched to the new master node, the new master node may provide a read/write service. In addition, after the standby node is switched to the new master node, if undoing (undoing) further needs to be performed, the new master node starts a background thread to perform undoing. Because undoing is performed in the background, another service of the new master node is not blocked. This application further provides a database system. FIG. 2 is an architectural diagram of a database system. The database system may be configured to perform the first fault repair method. Because the database system has been described in detail in the foregoing embodiment, this embodiment describes only a part not mentioned in the foregoing embodiment. In this embodiment and another embodiment of a database system, for a part described in the foregoing embodiment, directly refer to the related descriptions in the foregoing embodiment. Therefore, details are not described again.

It is easy to learn that the database system includes the master node 210, the standby node 230, and the GBP node 220, and the master node 210 and the GBP node 220 are communicatively connected by using a first data transmission protocol.

When the master node 210 works normally, the master node 210 is configured to send a plurality of pages to the GBP node 220 by using the first data transmission protocol.

The GBP node 220 is configured to write the plurality of pages into a cache queue of the GBP node. It should be noted that LSNs corresponding to the plurality of pages are in ascending order based on a sequence from a header to a tail of the cache queue.

When the master node 210 is faulty, the standby node 230 is configured to determine a GBP start point, a GBP recovery point, and a GBP end point.

For definitions of the GBP start point, the GBP recovery point, and the GBP end point, refer to the foregoing descriptions.

When a disk recovery point is greater than or equal to the GBP start point and a disk end point is greater than or equal to the GBP end point, the standby node 230 is further configured to replay all redo logs between a redo log corresponding to the GBP recovery point and a redo log corresponding to the disk end point.

For definitions of the disk recovery point and the disk end point, also refer to the foregoing descriptions.

In an embodiment of this application, in the database system, the GBP node 220 is configured to: receive a new page, and update the GBP start point, the GBP recovery point, and the GBP end point based on the new page.

It should be noted that when the GBP node 220 maintains the GBP start point, the GBP recovery point, and the GBP end point, optionally, the standby node 230 is further configured to obtain the GBP start point, the GBP recovery point, and the GBP end point from the GBP node.

Optionally, when the GBP node 220 receives a new page and the new page does not exist in a page buffer of the GBP node, the GBP node 220 is further configured to place the new page at the tail of the cache queue.

Optionally, when the GBP node 220 receives a new page and the new page exists in a page buffer of the GBP node, the GBP node 220 is further configured to: update an existing corresponding page based on the received new page, and place the updated new page at the tail of the cache queue.

Optionally, when the GBP node 220 receives a new page and the new page exists in a page buffer of the GBP node, the GBP node 220 is further configured to: discard an existing page corresponding to the new page, and place the new page at the tail of the cache queue.

Optionally, when the GBP node 220 receives a new page that does not exist in a page buffer of the GBP node and the page buffer of the GBP node is full, the GBP node 220 is further configured to: evict a page located in the header of the cache queue, and update the GBP start point to an LSN corresponding to a new header page of the cache queue. Certainly, after evicting the page located in the header of the cache queue, the GBP node 220 is further configured to place the new page that does not exist in the page buffer of the GBP node at the tail of the cache queue.

In another embodiment of this application, when the disk recovery point is greater than or equal to the GBP start point and the disk end point is greater than or equal to the GBP end point, the standby node 230 is further configured to start a background thread, where the background thread is configured to pull all pages stored on the GBP node 220 to a page buffer of the standby node.

Optionally, the background thread is configured to pull all the pages stored on the GBP node 220 to the page buffer of the standby node by using a second data transmission protocol.

It should be noted that replaying all the redo logs between the redo log corresponding to the GBP recovery point and the redo log corresponding to the disk end point by the standby node 230 may be completed asynchronously with pulling all the pages stored on the GBP node 220 to the page buffer of the standby node by the standby node 230.

It should be noted that after the master node 210 is faulty, before the standby node 230 replays the redo logs, the standby node 230 is further configured to determine or locally obtain the disk recovery point and the disk end point.

It should be learned that when the master node 210 works normally, the master node 210 is further configured to send redo logs to the standby node 230. Correspondingly, the standby node 230 is further configured to replay the redo logs to obtain corresponding pages.

Optionally, the master node 210 is configured to start a page sending thread, and the page sending thread may send a plurality of pages in a sending queue to the GBP node 220 in batches based on a sequence from a header to a tail of the sending queue by using the first data transmission protocol. The sending queue is located in the master node 210, and LSNs included the plurality of pages in the sending queue are in ascending order from the header to the tail of the sending queue.

Further, the master node 210 is further configured to start a plurality of page sending threads, and the master node 210 may include a plurality of sending queues. There is a one-to-one relationship between the plurality of page sending threads and the page sending queues.

Optionally, the GBP node 220 is configured to start a page receiving thread, and the page receiving thread may receive the plurality of pages in batches by using the first data transmission protocol, and write the plurality of pages into the cache queue of the GBP node.

Further, the GBP node 220 is further configured to start a plurality of page receiving threads, and the page buffer of the GBP node includes a plurality of cache queues. There is a one-to-one relationship between the plurality of page receiving threads and the plurality of cache queues.

In addition, there may also be a one-to-one relationship between the plurality of page sending threads started by the master node 210 and the plurality of page receiving threads started by the GBP node 220. It should be learned that in this case, there is also a one-to-one relationship between the plurality of sending queues and the plurality of cache queues, in other words, a plurality of pages in each sending queue may be sent to one corresponding cache queue.

FIG. 10 is a flowchart of a second fault repair method for a database system according to this application. It should be noted that the second fault repair method for the database system (simply referred to as a "second fault repair method") is described from the perspective of a standby node, and the first fault repair method for the database system (simply referred to as the "first fault repair method") is described from the perspective of the system. Because the standby node is a part of the system, the second fault repair method and the first fault repair method are the same in many aspects. Based on this, in the following embodiment of the second fault repair method, only a different part from the first fault repair method is described. For a same part as the first fault repair method, refer to the foregoing related embodiment.

As shown in FIG. 10, the second fault repair method includes the following steps.

S201. When a master node is faulty, determine a GBP start point, a GBP recovery point, and a GBP end point.

It should be noted that all pages stored on a GBP node are sent by the master node to the GBP node by using a first data transmission protocol when the master node works normally and are written into a cache queue of the GBP node by the GBP node. Log sequence numbers (LSNs) corresponding to the plurality of pages are in ascending order based on a sequence from a header to a tail of the cache queue.

S203. When a disk recovery point is greater than or equal to the GBP start point and a disk end point is greater than or equal to the GBP end point, replay all redo logs between a redo log corresponding to the GBP recovery point and a redo log corresponding to the disk end point.

For definitions of the GBP start point, the GBP recovery point, the GBP end point, the disk recovery point, and the disk end point, refer to the foregoing descriptions.

It should be noted that none of redo logs between a redo log corresponding to the disk recovery point and the redo log corresponding to the GBP recovery point are replayed.

It should be noted that when the disk recovery point is greater than or equal to the GBP start point and the disk end point is greater than or equal to the GBP end point, the fault repair method provided in this embodiment further includes: starting a background thread, where the background thread is configured to pull all the pages stored on the GBP node to a page buffer.

Optionally, the background thread pulls all the pages stored on the GBP node to the page buffer by using a second data transmission protocol.

It should be learned that after the master node is faulty, before the replaying step is performed, the fault repair method provided in this embodiment further includes: obtaining the disk recovery point and the disk end point; and when the master node works normally, receiving redo logs sent by the master node, replaying the redo logs to obtain corresponding pages, and flushing the obtained pages to a local disk in batches.

Optionally, after the replaying step is completed, when a page that needs to be accessed is still located in a page buffer of the GBP node, the fault repair method provided in this embodiment further includes: reading, from the page buffer of the GBP node, the page that needs to be accessed.

FIG. 11A and FIG. 11B are schematic structural diagrams of a first computing device 500 according to this application. The computing device 500 may be the standby node mentioned in the second fault repair method, and the computing device 500 may perform the fault repair method described from the perspective of the standby node. The standby node and the master node mentioned in the second fault repair method may be two independent nodes.

Specifically, as shown in FIG. 11A, the computing device 500 includes at least a determining unit 510 and a replaying unit 530. When a master node is faulty, the determining unit 510 is configured to determine a GBP start point, a GBP recovery point, and a GBP end point.

For definitions of the GBP start point, the GBP recovery point, and the GBP end point, refer to the foregoing descriptions.

It should be noted that all pages stored on a GBP node are sent by the master node to the GBP node by using a first data transmission protocol when the master node works normally and are written into a cache queue of the GBP node by the GBP node. Log sequence numbers (LSNs) corresponding to the plurality of pages are in ascending order based on a sequence from a header to a tail of the cache queue.

When a disk recovery point is greater than or equal to the GBP start point and a disk end point is greater than or equal to the GBP end point, the replaying unit 530 is configured to replay all redo logs between a redo log corresponding to the GBP recovery point and a redo log corresponding to the disk end point. For definitions of the disk recovery point and the disk end point, also refer to the foregoing descriptions.

In an embodiment of this application, as shown in FIG. 11B, the computing device 500 further includes a starting unit 540. When the disk recovery point is greater than or equal to the GBP start point and the disk end point is greater than or equal to the GBP end point, the starting unit 540 is configured to start a background thread, where the background thread is configured to pull all the pages stored on the GBP node to a page buffer.

It should be learned that after the master node is faulty, before the replaying unit 530 performs the replaying step, the determining unit 510 is further configured to obtain the disk recovery point and the disk end point.

It should be noted that as shown in FIG. 11B, the computing device further includes a receiving unit 520. When the master node works normally, the receiving unit 520 is configured to receive redo logs sent by the master node. Correspondingly, the replaying unit 530 is configured to replay the redo logs to obtain corresponding pages.

In another embodiment of this application, as shown in FIG. 11B, the computing device further includes a reading unit 550. After the replaying step is completed, when a page that needs to be accessed is still located in a page buffer of the GBP node, the reading unit 550 is configured to read, from the page buffer of the GBP node, the page that needs to be accessed.

Figure 12:
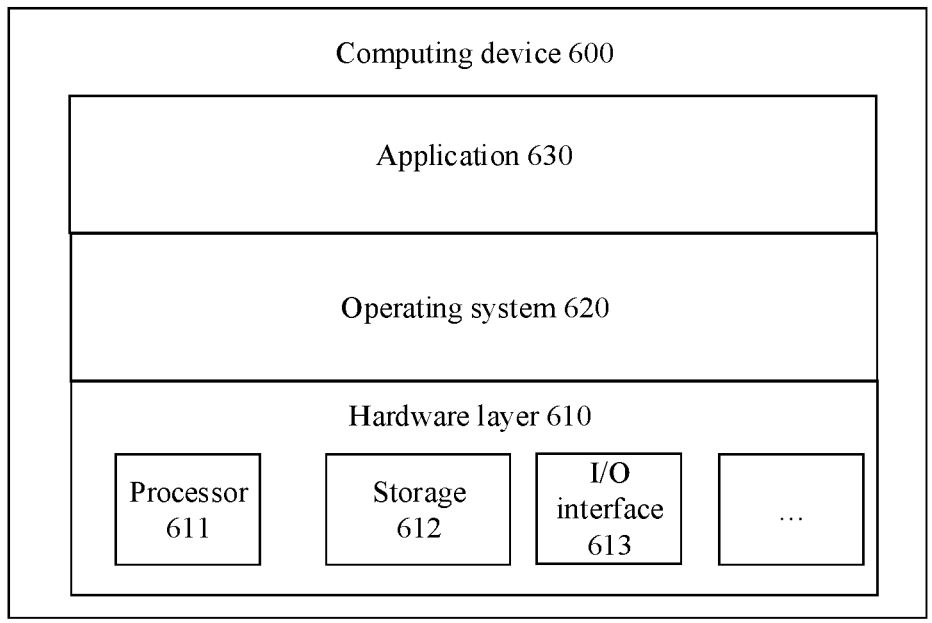
FIG. 12 is a structural diagram of another computing device according to this application.

FIG. 12 is a schematic structural diagram of a second computing device 600 according to this application. The computing device 600 may be the standby node mentioned in the second fault repair method, and the computing device 600 may perform the second fault repair method described from the perspective of the standby node. Specifically, as shown in FIG. 12, an operating system 620 runs above a hardware layer 610 of the computing device 600, and an application 630 runs above the operating system 620. The hardware layer 610 includes a processor 611, storage 612, an input/output (I/O) interface 613, and the like. The storage 612 stores executable code; and when being executed by the processor 611, the executable code is configured to implement components and functions of the computing device 600. In this embodiment, the storage 612 is configured to store a disk recovery point and a disk end point.

Specifically, when a master node is faulty, the processor 611 is configured to determine a GBP start point, a GBP recovery point, and a GBP end point.

It should be noted that all pages stored on a GBP node are sent by the master node to the GBP node by using a first data transmission protocol when the master node works normally and are written into a cache queue of the GBP node by the GBP node. Log sequence numbers (LSNs) corresponding to the plurality of pages are in ascending order based on a sequence from a header to a tail of the cache queue.

When the disk recovery point is greater than or equal to the GBP start point and the disk end point is greater than or equal to the GBP end point, the processor 611 is further configured to replay all redo logs between a redo log corresponding to the GBP recovery point and a redo log corresponding to the disk end point.

It should be emphasized that in this embodiment, none of redo logs between a redo log corresponding to the disk recovery point and the redo log corresponding to the GBP recovery point are replayed.

In another embodiment of this application, when the disk recovery point is greater than or equal to the GBP start point and the disk end point is greater than or equal to the GBP end point, the processor 611 is further configured to start a background thread, where the background thread is configured to pull all the pages stored on the GBP node to a page buffer.

In still another embodiment of this application, after the replaying step is completed, when a page that needs to be accessed is still located in a page buffer of the GBP node, the processor 611 is further configured to read, from the page buffer of the GBP node, the page that needs to be accessed.

It should be learned that after the master node is faulty, before the processor performs the replaying step, the processor 611 is further configured to obtain the disk recovery point and the disk end point from the storage.

In yet another embodiment of this application, when the master node works normally, the I/O interface 613 is configured to receive redo logs sent by the master node. Correspondingly, the processor 611 is configured to replay the redo logs to obtain corresponding pages.

It should be noted that this application provides a first data backup method. The first data backup method includes at least the following: sending a page to a GBP node by using an RDMA protocol in a process of transferring a redo log to a standby node, so that when a fault occurs, the fault is repaired by using the page in the GBP node.

In this embodiment, in the process of transferring the redo log to the standby node, a modified page is further sent to the GBP node by using the RDMA protocol, for backup on the GBP node. Because using the RDMA protocol can enable modified pages corresponding to most redo logs sent to the standby node to be sent to the GBP node, when a local node is faulty, remaining redo logs that are not replayed by the standby node include two parts. A first part of redo logs are all redo logs between a redo log corresponding to a disk recovery point and a redo log corresponding to a GBP recovery point, and the second part of redo logs are all redo logs between the redo log corresponding to the GBP recovery point and a redo log corresponding to a disk end point. The standby node only needs to replay the second part of redo logs to obtain corresponding pages to implement fault repair, because pages corresponding to the first part of redo logs can be directly pulled from the GBP node. It can be learned that using the data backup method provided in this embodiment can improve fault repair efficiency.

Figure 13:
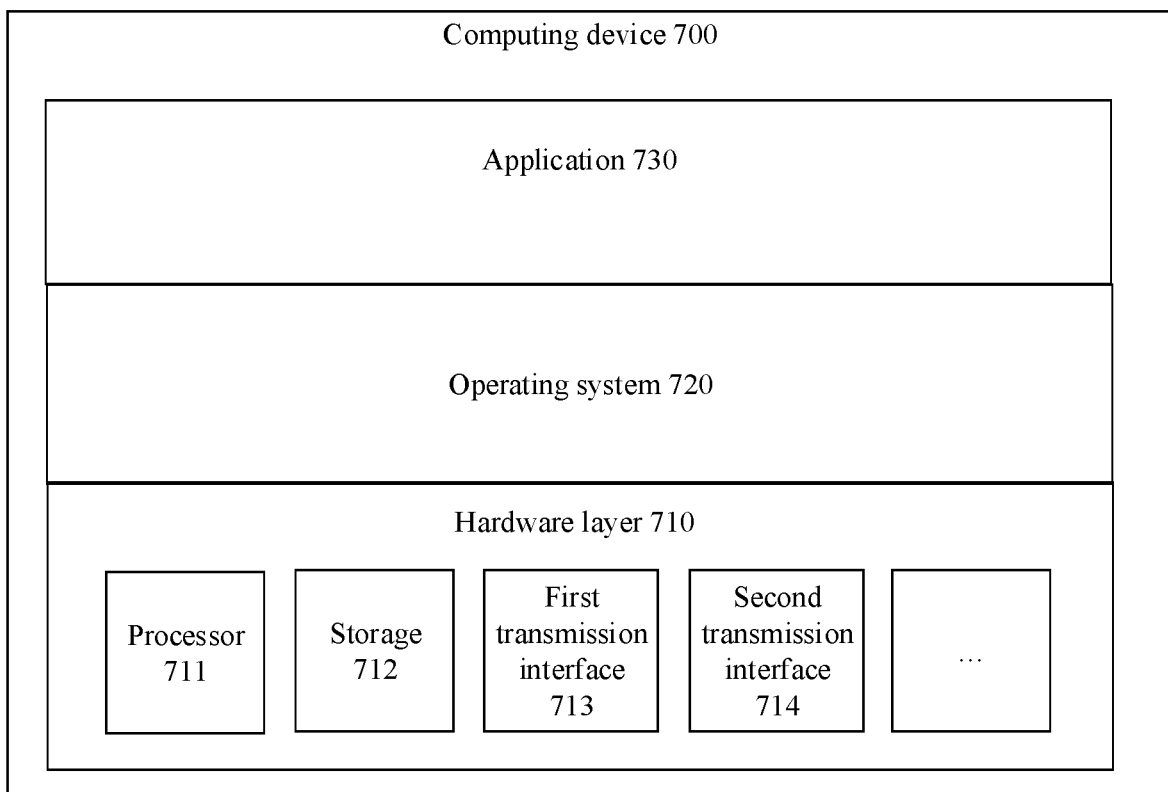
FIG. 13 is a structural diagram of another computing device according to this application.

Corresponding to the first data backup method, this application further provides a third computing device 700. The computing device 700 may perform the first data backup method. As shown in FIG. 13, an operating system 720 runs above a hardware layer 710 of the computing device 700, and an application 730 runs above the operating system 720. The hardware layer 710 includes a processor 711, storage 712, a first transmission interface 713, a second transmission interface 714, and the like. The storage 712 stores executable code, and when being executed by the processor 711, the executable code is configured to implement components and functions of the computing device 700.

In this embodiment, the first transmission interface 713 is configured to send a redo log to a standby node. When the first transmission interface 713 transfers the redo log to the standby node, the second transmission interface 714 is configured to send a page to a GBP node based on an RDMA protocol, so that when a fault occurs, the fault is repaired by using the page in the GBP node.

Similarly, when a database system using the computing device 700 performs fault repair, fault repair efficiency is relatively high.

This application further provides a third fault repair method for a database system (simply referred to as a "third fault repair method"). First, the third fault repair method may be applied to a database system shown in FIG. 14. The database system includes a master node 800 and a GBP node 900. The third fault repair method is also described from the perspective of the system. However, the third fault repair method is different from the first fault repair method. A difference between the two methods lies in the following: In the first fault repair method, the master node 210, the standby node 230, and the GBP node 220 are involved, and when the master node is faulty, the standby node is promoted to a new master node by replaying a log. That is, in the first fault repair method, after the master node is faulty, the standby node is promoted to the new master node. However, in the third fault repair method for the database system, only the master node 800 and the GBP node 900 are involved, and when the master node 800 is faulty, the master node 800 is restarted by replaying a redo log.

It should be noted that if software of the master node is faulty, the master node usually can be restarted. If hardware of the master node is faulty, the master node usually cannot be started. Therefore, the first fault repair method may be used when the software of the master node is faulty, or may be used when the hardware of the master node is faulty, but the third fault repair method usually may be used only when the software of the master node is faulty.

It should be noted that the third fault repair method and the first fault repair method are the same in many aspects. Therefore, when the following describes the third fault repair method, only a different part from the first fault repair method is described. For a same part, directly refer to the foregoing descriptions.

Figure 15:
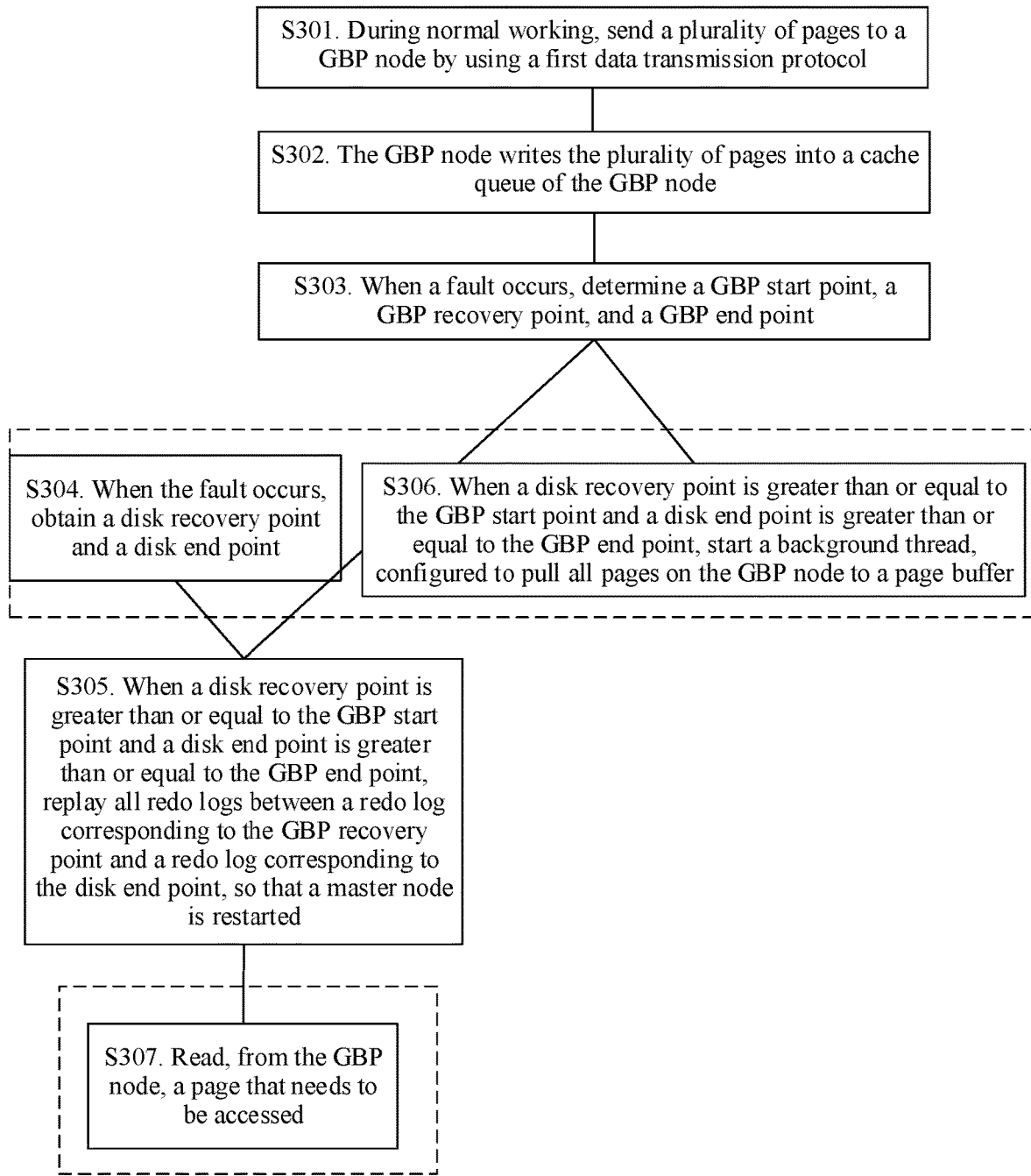
FIG. 15 is a flowchart of another fault repair method for a database system according to this application.

FIG. 15 is a flowchart of the third fault repair method. It should be noted that in the third fault repair method, S301, S303, and S305 are all performed by the master node 800, and S302 is performed by the GBP node 900. In the first fault repair method, S101 is performed by the master node 210, S102 is performed by the GBP node 220, and both S103 and S105 are performed by the standby node 230. It is easy to learn that S301 and S101 are almost the same, and S302 and S102 are almost the same.

S303 and S103 are almost the same except for a difference in execution bodies. S305 and S105 are also almost the same except for a difference in execution bodies.

Specifically, the third fault repair method includes the following steps.

S301. During normal working, send a plurality of pages to a GBP node by using a first data transmission protocol.

S302. The GBP node writes the plurality of pages into a cache queue of the GBP node.

It should be noted that LSNs corresponding to the plurality of pages are in ascending order based on a sequence from a header to a tail of the cache queue.

S303. When a fault occurs, determine a GBP start point, a GBP recovery point, and a GBP end point.

S305. When a disk recovery point is greater than or equal to the GBP start point and a disk end point is greater than or equal to the GBP end point, replay all redo logs between a redo log corresponding to the GBP recovery point and a redo log corresponding to the disk end point, so that the master node is restarted.

It should be noted that in this embodiment, none of redo logs between a redo log corresponding to the disk recovery point and the redo log corresponding to the GBP recovery point are replayed.

In another embodiment of this application, when the disk recovery point is greater than or equal to the GBP start point and the disk end point is greater than or equal to the GBP end point, the third fault repair method further includes: S306. Start a background thread, where the background thread is configured to pull all pages located on the GBP node to a page buffer. It should be learned that the pages pulled to the page buffer are further flushed to a local disk.

It is easy to learn that after a fault occurs, before replaying is performed, the third fault repair method further includes: S304. Obtain the disk recovery point and the disk end point.

In still another embodiment of this application, after the master node completes the replaying step, when a page that needs to be accessed is still located on the GBP node, the third fault repair method further includes: S307. Read, from the GBP node, the page that needs to be accessed.

Figure 14:
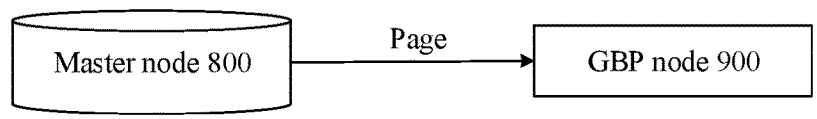
FIG. 14 is an architectural diagram of another database system according to this application.

This application further provides a database system. Referring to FIG. 14, the database system includes the master node 800 and the GBP node 900, and the master node 800 and the GBP node 900 are communicatively connected by using a first data transmission protocol. The database system may be configured to perform the third fault repair method.

The master node 800 is configured to send a plurality of pages to the GBP node 900 by using the first data transmission protocol.

The GBP node 900 is configured to write the plurality of pages into a cache queue of the GBP node.

Log sequence numbers (LSNs) included in the plurality of pages are in ascending order based on a sequence from a header to a tail of the cache queue.

When the master node is faulty, the master node 800 is further configured to determine a GBP start point, a GBP recovery point, and a GBP end point. When a disk recovery point is greater than or equal to the GBP start point and a disk end point is greater than or equal to the GBP end point, the master node 800 is further configured to replay all redo logs between a redo log corresponding to the GBP recovery point and a redo log corresponding to the disk end point.

For definitions of the GBP start point, the GBP recovery point, the GBP end point, the disk recovery point, and the disk end point, refer to the foregoing descriptions.

It should be learned that none of redo logs between a redo log corresponding to the disk recovery point and the redo log corresponding to the GBP recovery point are replayed.

In another embodiment of this application, when the disk recovery point is greater than or equal to the GBP start point and the disk end point is greater than or equal to the GBP end point, the master node 800 is further configured to start a background thread, where the background thread is configured to pull all pages located on the GBP node to a page buffer.

Optionally, the background thread pulls all the pages located on the GBP node to the page buffer by using the first data transmission protocol.

It should be noted that after the master node completes the replaying step, when a page that needs to be accessed is still located in a page buffer of the GBP node, the master node 800 is further configured to read, from the page buffer of the GBP node, the page that needs to be accessed.

As shown in FIG. 16, this application further provides a fourth fault repair method for a database system. The fourth fault repair method is performed by the master node 800 in FIG. 14. The fault repair method includes the following steps:

S311. During normal working, send a plurality of pages to a GBP node by using a first data transmission protocol.

S313. When a fault occurs, determine a GBP start point, a GBP recovery point, and a GBP end point.

S315. When a disk recovery point is greater than or equal to the GBP start point and a disk end point is greater than or equal to the GBP end point, replay all redo logs between a redo log corresponding to the GBP recovery point and a redo log corresponding to the disk end point.

It should be noted that the plurality of pages are written into a cache queue of the GBP node, and log sequence numbers (LSNs) corresponding to the plurality of pages are in ascending order based on a sequence from a header to a tail of the cache queue.

It should be explained that for definitions of the GBP start point, the GBP recovery point, the GBP end point, the disk recovery point, and the disk end point, refer to the foregoing descriptions, and details are not described herein again.

Because the fourth fault repair method has been described in detail in the summary, details are not described herein again. It should be noted that in this application, the fault repair method performed by the database system including the master node, the standby node, and the GBP node is described in full detail. There is a quite strong association relationship between another embodiment and the foregoing embodiment. Therefore, for the another embodiment, refer to the embodiment described in full detail. To avoid repeating same content, all the following other embodiments are described relatively briefly. However, it should be learned that for understanding of each briefly described embodiment, refer to the summary and the foregoing embodiment described in full detail.

This application further provides a fourth computing device 1000. The fourth computing device 1000 may be configured to perform the fourth fault repair method, in other words, the fourth computing device 1000 may implement functions of the master node in the fourth fault repair method. As shown in FIG. 17, the computing device 1000 includes at least a sending unit 1010, a determining unit 1020, and a replaying unit 1030.

Specifically, during normal working, the sending unit 1010 is configured to send a plurality of pages to a GBP node by using a first data transmission protocol. Log sequence numbers (LSNs) corresponding to the plurality of pages are in ascending order based on a sequence from a header to a tail of a cache queue.

When a fault occurs, the determining unit 1020 is configured to determine a GBP start point, a GBP recovery point, and a GBP end point.

When a disk recovery point is greater than or equal to the GBP start point and a disk end point is greater than or equal to the GBP end point, the replaying unit 1030 is configured to replay all redo logs between a redo log corresponding to the GBP recovery point and a redo log corresponding to the disk end point.

Optionally, the computing device further includes a starting unit 1040. When the disk recovery point is greater than or equal to the GBP start point and the disk end point is greater than or equal to the GBP end point, the starting unit 1040 is configured to start a background thread, where the background thread is configured to pull all pages located on the GBP node to a page buffer of the computing device.

Further, the computing device further includes a reading unit 1050, and after the replaying step is completed, when a page that needs to be accessed is still located on the GBP node, the reading unit 1050 is configured to read, from the GBP node, the page that needs to be accessed.

Figure 18:
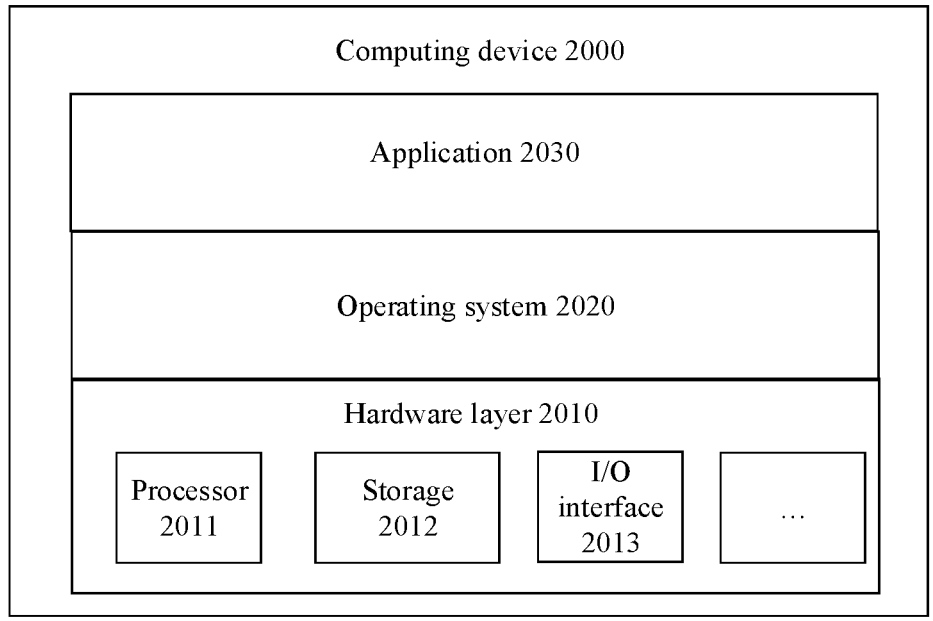
FIG. 18 is a structural diagram of another computing device according to this application.

This application further provides a fifth computing device 2000. The fifth computing device 2000 may be configured to perform the third fault repair method. As shown in FIG. 18, an operating system 2020 runs above a hardware layer 2010 of the computing device 2000, and an application 2030 runs above the operating system 2020. The hardware layer 2010 includes a processor 2011, storage 2012, an I/O interface 2013, and the like. The storage 2012 stores executable code, and when being executed by the processor 2011, the executable code is configured to implement components and functions of the computing device 2000.

In this embodiment, the storage 2012 is configured to store a GBP start point, a GBP recovery point, a GBP end point, a disk recovery point, and a disk end point.

During normal working, the processor 2011 is configured to send a plurality of pages to a GBP node by using a first data transmission protocol. Log sequence numbers (LSNs) corresponding to the plurality of pages are in ascending order based on a sequence from a header to a tail of a cache queue. When a fault occurs, the processor 2011 is further configured to determine the GBP start point, the GBP recovery point, and the GBP end point.

When the disk recovery point is greater than or equal to the GBP start point and the disk end point is greater than or equal to the GBP end point, the processor 2011 is further configured to replay all redo logs between a redo log corresponding to the GBP recovery point and a redo log corresponding to the disk end point.

It should be noted that when the disk recovery point is greater than or equal to the GBP start point and the disk end point is greater than or equal to the GBP end point, the processor 2011 is further configured to start a background thread, where the background thread is configured to pull all pages located on the GBP node to a page buffer.

Optionally, after the replaying step is completed (after a standby node is started), when a page that needs to be accessed is still located on the GBP node, the processor 2011 is further configured to read, from the GBP node, the page that needs to be accessed.

Figure 19:
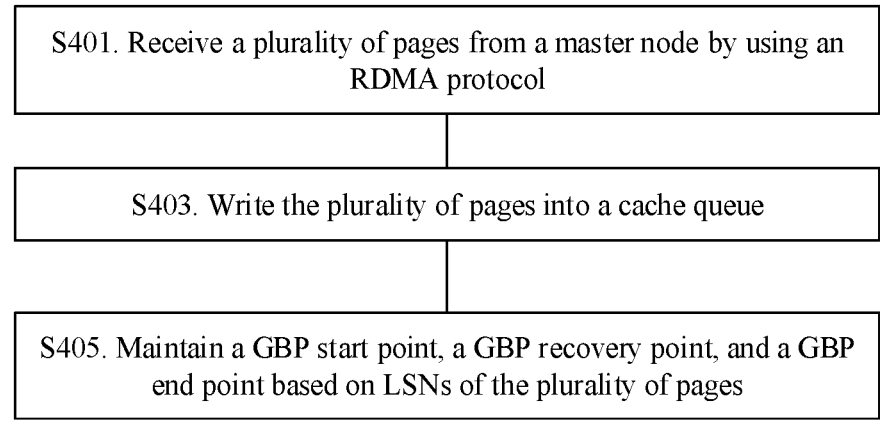
FIG. 19 is a flowchart of a data backup method according to this application.

This application further provides a second data backup method. Compared with the first data backup method, the second data backup method is performed by a GBP node. The GBP node may be the GBP node in the first fault repair method, or may be the GBP node in the third fault repair method. As shown in FIG. 19, the second data backup method includes the following steps:

S401. Receive a plurality of pages from a master node by using an RDMA protocol.

S403. Write the plurality of pages into a cache queue. LSNs included in the plurality of pages are in ascending order based on a sequence from a header to a tail of the cache queue.

S405. Maintain a GBP start point, a GBP recovery point, and a GBP end point based on the LSNs of the plurality of pages, so that fault repair is performed based on the GBP start point, the GBP recovery point, and the GBP end point when the master node is faulty.

In an embodiment of the second data backup method, when a new page that does not exist in a memory is received, S403 specifically includes: placing the new page at the tail of the cache queue.

For explanations of the "new page", refer to the explanations of the "new page" in the embodiment corresponding to the first fault repair method. Details are not described herein again.

In another embodiment, when a new page that does not exist in a memory is received and the cache queue is full, S403 specifically includes: evicting a page located in the header of the cache queue, storing the new page in the tail of the cache queue, and updating the GBP start point to an LSN corresponding to a new page located in the header of the cache queue.

In still another embodiment, when a new page that exists in a memory is received, S403 specifically includes: updating an existing corresponding page by using the new page, and placing the updated page at the tail of the cache queue.

It should be noted that each time a batch of pages is received, the GBP recovery point and the GBP end point are certainly updated, and the GBP start point may be updated. Because definitions of the GBP start point, the GBP recovery point, and the GBP end point are described above, details are not described herein again. It should be learned that the GBP start point, the GBP recovery point, and the GBP end point only need to be updated based on the definitions of the GBP start point, the GBP recovery point, and the GBP end point and a received page.

In the embodiment corresponding to the third fault repair method, the GBP node and a standby node of the master node are deployed in a same process, in other words, the standby node may implement functions of the standby node in the first fault repair method, and may also implement functions of the GBP node in the first fault repair method, or an application that can implement a global page cache function is installed on the standby node. When the GBP node and the standby node are deployed in a same process, the second data backup method further includes: receiving a plurality of redo logs, and replaying the plurality of redo logs to obtain a page corresponding to each of the plurality of redo logs.

This application further provides a sixth computing device 3000. The sixth computing device 3000 may perform the second data backup method, in other words, the sixth computing device 3000 may implement functions of the GBP node in the foregoing embodiment.

Figure 20:
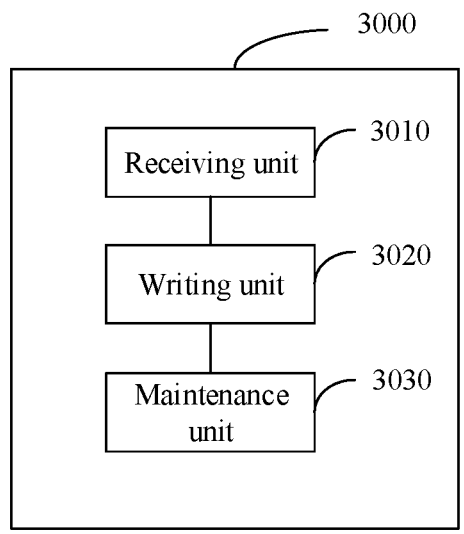
FIG. 20 is a structural diagram of another computing device according to this application.

Specifically, as shown in FIG. 20, the sixth computing device 3000 includes at least a receiving unit 3010, a writing unit 3020, and a maintenance unit 3030. The receiving unit 3010 is configured to receive a plurality of pages from a master node by using an RDMA protocol. The writing unit 3020 is configured to write the plurality of pages into a cache queue. It should be noted that log sequence numbers (LSNs) corresponding to the plurality of pages are in ascending order based on a sequence from a header to a tail of the cache queue. The maintenance unit 3030 is configured to maintain a GBP start point, a GBP recovery point, and a GBP end point based on an LSN of each of the plurality of pages, so that fault repair is performed based on the GBP start point, the GBP recovery point, and the GBP end point when the master node is faulty.

It should be learned that when a new page that does not exist in a memory is received, the writing unit 3020 is further configured to place the new page at the tail of the cache queue.

It should be noted that when a new page that does not exist in the memory is received and the cache queue is full, the writing unit 3020 is further configured to: evict a page located in the header of the cache queue, and store the new page in the tail of the cache queue. Correspondingly, the maintenance unit 3030 is further configured to update the GBP start point to an LSN corresponding to a new page located in the header of the cache queue.

Further, when a new page that exists in the memory is received, the writing unit 3020 is further configured to: update an existing corresponding page by using the new page, and place the updated page at the tail of the cache queue.

It should be learned that each time a batch of pages is received, the maintenance unit 3030 is further configured to update the GBP recovery point and the GBP end point based on the received pages.

When the sixth computing device can implement functions of the GBP node in the foregoing embodiment and functions of the standby node, the receiving unit is further configured to receive a plurality of redo logs, and in addition, the sixth computing device further includes a replaying unit. The replaying unit is configured to replay the plurality of redo logs to obtain a page corresponding to each of the plurality of redo logs.

Figure 21:
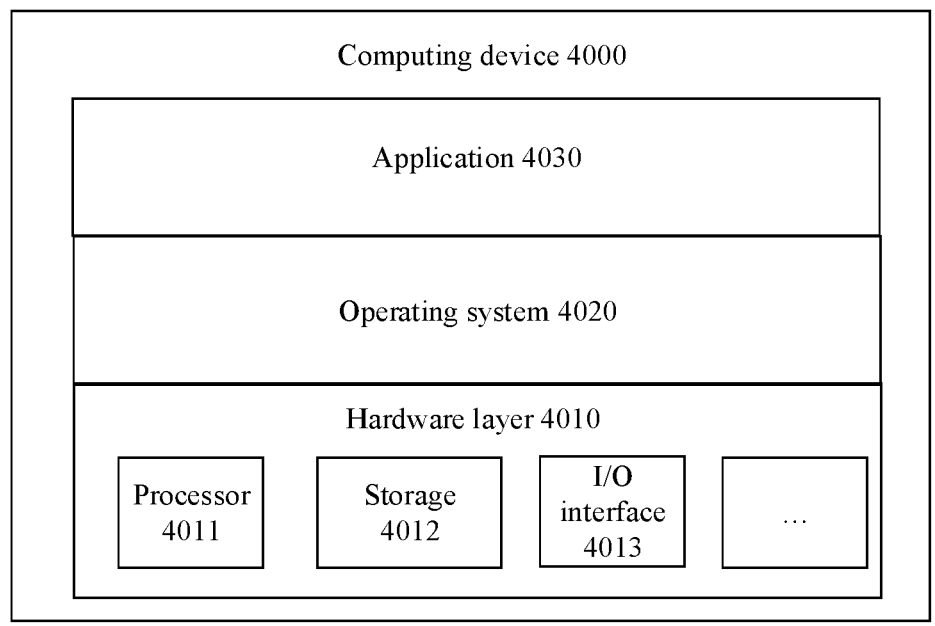
FIG. 21 is a structural diagram of another computing device according to this application.

This application further provides a seventh computing device 4000. The seventh computing device 4000 may also perform the second data backup method, in other words, the seventh computing device 4000 may implement functions of the GBP node in the foregoing embodiment. Specifically, as shown in FIG. 21, an operating system 4020 runs above a hardware layer 4010 of the computing device 4000, and an application 4030 runs above the operating system 4020. The hardware layer 4010 includes a processor 4011, storage 4012, an I/O interface 4013, and the like. The storage 4012 stores executable code, and when being executed by the processor 4011, the executable code is configured to implement components and functions of the computing device 4000.

In this embodiment, the I/O interface 4013 is configured to receive a plurality of pages from a master node by using an RDMA protocol. The processor 4011 is configured to: sequentially write the plurality of pages into a cache queue, and maintain a GBP start point, a GBP recovery point, and a GBP end point based on an LSN included in each of the plurality of pages.

It should be noted that LSNs corresponding to the plurality of pages are in ascending order based on a sequence from a header to a tail of the cache queue. In addition, the GBP start point, the GBP recovery point, and the GBP end point are maintained, so that fault repair can be performed based on the GBP start point, the GBP recovery point, and the GBP end point when the master node is faulty.

It should be learned that when a new page that does not exist in a memory is received, the processor 4011 is further configured to place the new page at the tail of the cache queue.

It should be noted that when a new page that does not exist in the memory is received and the cache queue is full, the processor 4011 is further configured to: evict a page located in the header of the cache queue, store the new page in the tail of the cache queue, and update the GBP start point to an LSN corresponding to a new page located in the header of the cache queue.

Further, when a new page that exists in the memory is received, the processor 4011 is further configured to: update an existing corresponding page by using the new page, and place the updated page at the tail of the cache queue.

It should be learned that each time a batch of pages is received, the processor 4011 is further configured to update the GBP recovery point and the GBP end point based on the received pages.

When the seventh computing device 4000 can implement functions of the GBP node in the foregoing embodiment and functions of the standby node, the processor 4011 is further configured to: receive a plurality of redo logs, and replay the plurality of redo logs to obtain a page corresponding to each of the plurality of redo logs.

It should be noted that a plurality of subjects of protection are involved in this application, and each subject of protection corresponds to a plurality of embodiments. However, these subjects of protection and these embodiments are associated with each other. In this application, before the fault repair method for the database system including the master node, the standby node, and the GBP node is described, much common content is described, and the content is applicable to all subsequent related embodiments. In addition, in this application, except that the fault repair method for the database system including the master node, the standby node, and the GBP node is described in great detail, other embodiments are described relatively briefly. It should be learned that for understanding of all other embodiments, refer to content of any related part in this application. In this application, mutual reference may be made between the embodiments.

What is claimed is:

1. A fault repair method for a database system, comprising:

sending, by a master node, a plurality of pages to a global buffer pool (GBP) node using a first data transmission protocol, when the master node works normally;

writing, by the GBP node, the plurality of pages into a cache queue of the GBP node, log sequence numbers (LSNs) corresponding to the plurality of pages are in ascending order from a header to a tail of the cache queue;

determining, by a standby node, a GBP start point, a GBP recovery point, and a GBP end point when the master node is faulty, the GBP start point indicating a smallest LSN comprised in all pages stored on the GBP node, the GBP recovery point indicating a smallest LSN comprised in a most recently received batch of pages received by the GBP node, and the GBP end point indicating a largest LSN comprised in the most recently received batch of pages received by the GBP node; and replaying, by the standby node, all redo logs between a redo log corresponding to the GBP recovery point and a redo log corresponding to the disk end point when a disk recovery point is greater than or equal to the GBP start point and a disk end point is greater than or equal to the GBP end point, the disk recovery point indicating a smallest LSN comprised in a batch of a plurality of most recently written pages in a disk of the standby node, and the disk end point indicating a LSN of a last redo log received by the standby node.

2. The fault repair method according to claim 1, wherein no redo logs between a redo log corresponding to the disk recovery point and the redo log corresponding to the GBP recovery point are replayed.

3. The fault repair method according to claim 1, wherein the GBP node maintains the GBP recovery point and the GBP end point, and after the GBP node writes the plurality of pages into the cache queue of the GBP node, the method further comprises:
updating, by the GBP node, the GBP recovery point and the GBP end point based on the plurality of pages; and
the determining, by the standby node, the GBP start point, the GBP recovery point, and the GBP end point comprises obtaining, by the standby node, an updated GBP recovery point and an updated GBP end point from the GBP node.

4. The fault repair method according to claim 1, wherein the GBP node maintains the GBP start point, and when the GBP node receives a new page that does not exist in a page buffer of the GBP node and the page buffer of the GBP node is full, the method further comprises:
evicting, by the GBP node, a page located in the header of the cache queue;
updating the GBP start point to a LSN corresponding to a new header page of the cache queue; and
the determining, by the standby node, the GBP start point, the GBP recovery point, and the GBP end point comprises obtaining, by the standby node, an updated GBP start point from the GBP node.

5. The fault repair method according to claim 1, wherein:
when the GBP node receives a new page that does not exist in a page buffer of the GBP node, the writing, by the GBP node, the plurality of pages into the cache queue of the GBP node comprises placing, by the GBP node, the new page at the tail of the cache queue; or
when the GBP node receives the new page that exists in the page buffer of the GBP node, the writing, by the GBP node, the plurality of pages into the cache queue of the GBP node comprises
updating, by the GBP node, an existing page corresponding to the new page based on the received new page; and
placing the updated page at the tail of the cache queue.

6. The fault repair method according to claim 1, further comprising:
starting, by the standby node, a background thread when the disk recovery point is greater than or equal to the GBP start point and the disk end point is greater than or equal to the GBP end point;
the background thread being configured to pull all the pages stored on the GBP node to a page buffer of the standby node.

7. The fault repair method according to claim 6, wherein the background thread is configured to pull the all the pages stored on the GBP node to the page buffer of the standby node using a second data transmission protocol.

8. The fault repair method according to claim 1, wherein after the standby node completes the replaying step, when a page that needs to be accessed by an application on the standby node is still located in a page buffer of the GBP node, the application reads the page that needs to be accessed from the page buffer of the GBP node.

9. A database system, comprising:
a master node configured to send a plurality of pages to a global buffer pool (GBP) node using a first data transmission protocol;
a standby node; and
the GBP node, the GBP node being configured to write the plurality of pages into a cache queue of the GBP node, log sequence numbers (LSNs) corresponding to the plurality of pages are in ascending order from a header to a tail of the cache queue;
the standby node is configured to determine a GBP start point, a GBP recovery point, and a GBP end point when the master node is faulty, the GBP start point indicating a smallest log sequence number (LSN) comprised in all pages stored on the GBP node, the GBP recovery point indicating a smallest LSN comprised in a most recently received batch of pages received by the GBP node, and the GBP end point indicating a largest LSN comprised in the most recently received batch of pages received by the GBP node; and
the standby node is further configured to replay all redo logs between a redo log corresponding to the GBP recovery point and a redo log corresponding to the disk end point when a disk recovery point is greater than or equal to the GBP start point and a disk end point is greater than or equal to the GBP end point, the disk recovery point indicating a smallest LSN comprised in a batch of a plurality of most recently written pages in a disk of the standby node, and the disk end point indicating a LSN of a last redo log received by the standby node.

10. The system according to claim 9, wherein no redo logs between a redo log corresponding to the disk recovery point and the redo log corresponding to the GBP recovery point are replayed.

11. The system according to claim 9, wherein after writing the plurality of pages into the cache queue of the GBP node, the GBP node is further configured to update the GBP recovery point and the GBP end point based on the plurality of pages; and
the standby node is further configured to obtain an updated GBP recovery point and an updated GBP end point from the GBP node.

12. The system according to claim 9, wherein when the GBP node receives a new page that does not exist in a page buffer of the GBP node and the page buffer of the GBP node is full, the GBP node is further configured to:
evict a page located in the header of the cache queue; and
update the GBP start point to a LSN corresponding to a new header page of the cache queue; and
the standby node is further configured to obtain an updated GBP start point from the GBP node.

13. The system according to claim 9, wherein:
when the GBP node receives a new page that does not exist in a page buffer of the GBP node, the GBP node is further configured to place the new page at the tail of the cache queue; or when the GBP node receives the new page that exists in the page buffer of the GBP node, the GBP node is further configured to:
    update an existing page corresponding to the new page based on the received new page; and
    place the updated page at the tail of the cache queue.

14. The system according to claim 9, wherein the standby node is further configured to start a background thread when the disk recovery point is greater than or equal to the GBP start point and the disk end point is greater than or equal to the GBP end point, the background thread being configured to pull all the pages stored on the GBP node to a page buffer of the standby node.

15. The system according to claim 14, wherein the background thread is configured to pull the all the pages stored on the GBP node to the page buffer of the standby node using a second data transmission protocol.

16. A fault repair method for a database system, comprising:
    determining a global buffer pool (GBP) start point, a GBP recovery point, and a GBP end point when a master node is faulty, the GBP start point indicating a smallest log sequence number (LSN) comprised in all pages stored on a GBP node, the GBP recovery point indicating a smallest LSN comprised in a most recently received batch of pages received by the GBP node, the GBP end point indicating a largest LSN comprised in the most recently received batch of pages received by the GBP node, a plurality of pages stored on the GBP node are sent by the master node to the GBP node using a first data transmission protocol when the master node works normally, the plurality of pages are written into a cache queue of the GBP node by the GBP node, and LSNs corresponding to the plurality of pages are in ascending order from a header to a tail of the cache queue; and
    replaying all redo logs between a redo log corresponding to the GBP recovery point and a redo log corresponding to the disk end point when a disk recovery point is greater than or equal to the GBP start point and a disk end point is greater than or equal to the GBP end point, the disk recovery point indicating a smallest LSN comprised in a batch of a plurality of most recently written pages in a disk of a standby node, and the disk end point indicating a LSN of a last redo log received by the standby node.

17. The fault repair method according to claim 16, wherein no redo logs between a redo log corresponding to the disk recovery point and the redo log corresponding to the GBP recovery point are replayed.

18. The fault repair method according to claim 16, wherein the method further comprises: starting a background thread when the disk recovery point is greater than or equal to the GBP start point and the disk end point is greater than or equal to the GBP end point, the background thread being configured to pull all the pages stored on the GBP node to a page buffer.

19. The fault repair method according to claim 18, wherein the background thread is configured to pull the all the pages stored on the GBP node to the page buffer using a second data transmission protocol.

20. The fault repair method according to claim 16, wherein after the replaying step is completed, when a page that needs to be accessed is still located in a page buffer of the GBP node, the method further comprises: reading the page that needs to be accessed from the page buffer of the GBP node.

\* \* \* \* \*